(12) United States Patent
Park et al.

(10) Patent No.: US 10,830,980 B2
(45) Date of Patent: Nov. 10, 2020

(54) LENS DRIVING APPARATUS, CAMERA MODULE, AND OPTICAL INSTRUMENT

(71) Applicant: LG INNOTEK CO., LTD., Seoul (KR)

(72) Inventors: Sang Ok Park, Seoul (KR); Byung Wook Son, Seoul (KR); Sang Jun Min, Seoul (KR); Jun Taek Lee, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 170 days.

(21) Appl. No.: 16/069,112

(22) PCT Filed: Jan. 11, 2017

(86) PCT No.: PCT/KR2017/000352
§ 371 (c)(1),
(2) Date: Jul. 10, 2018

(87) PCT Pub. No.: WO2017/126842
PCT Pub. Date: Jul. 27, 2017

(65) Prior Publication Data
US 2019/0011614 A1  Jan. 10, 2019

(30) Foreign Application Priority Data

Jan. 19, 2016 (KR) .................. 10-2016-0006573
Mar. 24, 2016 (KR) .................. 10-2016-0035424
Jul. 13, 2016 (KR) .................. 10-2016-0088507

(51) Int. Cl.
*G02B 7/02* (2006.01)
*G02B 7/09* (2006.01)
(Continued)

(52) U.S. Cl.
CPC .................. *G02B 7/02* (2013.01); *G02B 5/20* (2013.01); *G02B 5/208* (2013.01); *G02B 7/09* (2013.01);
(Continued)

(58) Field of Classification Search
CPC .......... G02B 7/02; G02B 7/09; H04N 5/2253; H04N 5/2257
(Continued)

(56) References Cited

U.S. PATENT DOCUMENTS

2009/0310959 A1  12/2009  Shih et al.
2011/0176046 A1  7/2011  Hu et al.
(Continued)

FOREIGN PATENT DOCUMENTS

| | | |
|---|---|---|
| JP | 2009-301033 A | 12/2009 |
| KR | 10-2015-0042690 A | 4/2015 |
| KR | 10-2016-0004543 A | 1/2016 |

*Primary Examiner* — Darryl J Collins
(74) *Attorney, Agent, or Firm* — Birch, Stewart, Kolasch & Birch, LLP

(57) ABSTRACT

A lens driving device including a cover member; a housing disposed in the cover member; a bobbin disposed in the housing; a first coil disposed on the bobbin; a first magnet coupled to the housing; an upper elastic member coupled to the bobbin and the housing; a base disposed below the housing and coupled to the cover member; a substrate disposed between the housing and the base and including a circuit member having a second coil disposed to be opposite to the first magnet; and a plurality of support members connecting the upper elastic member and the substrate is provided. The support members are connected to the upper elastic member at a position where a length in the x direction and a length in the y direction are different on the basis of the edge of the upper elastic member.

20 Claims, 25 Drawing Sheets

(51) Int. Cl.
  *G03B 5/00*    (2006.01)
  *H02K 1/17*    (2006.01)
  *H04N 5/225*   (2006.01)
  *G02B 5/20*    (2006.01)
  *G03B 3/10*    (2006.01)
  *G02B 7/105*   (2006.01)
  *G02B 23/16*   (2006.01)

(52) U.S. Cl.
  CPC .............. *G02B 7/105* (2013.01); *G02B 23/16* (2013.01); *G03B 3/10* (2013.01); *G03B 5/00* (2013.01); *H02K 1/17* (2013.01); *H04N 5/225* (2013.01); *H04N 5/2253* (2013.01); *H04N 5/2257* (2013.01); *G03B 2205/0015* (2013.01); *G03B 2205/0023* (2013.01); *G03B 2205/0069* (2013.01); *H02K 2203/03* (2013.01)

(58) Field of Classification Search
  USPC ................................................ 359/814, 824
  See application file for complete search history.

(56) References Cited

U.S. PATENT DOCUMENTS

| | | |
|---|---|---|
| 2013/0215511 A1 | 8/2013 | Wu et al. |
| 2015/0103195 A1 | 4/2015 | Kwon et al. |
| 2016/0377881 A1* | 12/2016 | Jung .................. H02K 41/0356 |
| | | 359/824 |

* cited by examiner

LENS DRIVING APPARATUS, CAMERA MODULE, AND OPTICAL INSTRUMENT

CROSS REFERENCE TO RELATED APPLICATIONS

This application is the National Phase of PCT International Application No. PCT/KR2017/000352, filed on Jan. 11, 2017, which claims priority under 35 U.S.C. 119(a) to Patent Application No. 10-2016-0006573, filed in the Republic of Korea on Jan. 19, 2016, Patent Application No. 10-2016-0035424, filed in the Republic of Korea on Mar. 24, 2016 and Patent Application No. 10-2016-0088507, filed in the Republic of Korea on Jul. 13, 2016, all of which are hereby expressly incorporated by reference into the present application.

TECHNICAL FIELD

The teachings in accordance with exemplary and non-limiting embodiments of this invention relate generally to a lens driving device, a camera module, and an optical apparatus.

BACKGROUND ART

This section provides background information related to the present disclosure, which is not necessarily prior art.

Concomitant with widely generalized dissemination of various mobile terminals and commercialization of wireless Internet services, demands by consumers related to mobile terminals are diversified to thereby require various types of circumferential devices or additional equipment to be mounted on mobile terminals.

Inter alia, camera modules may be representative items photographing an object in a still picture or a video. The camera module can perform an auto focusing function that aligns a focal distance of a lens by adjusting a gap between an image sensor and the lens. Furthermore, camera modules equipped with handshake correction (OIS: Optical Image Stabilization) function to correct distortions of image or video caused by a user handshake during photographing of a subject have been developed. Moreover, a lens driving apparatus of a camera module may be formed with a cover member in order to accommodate and protect each part. Meantime, the cover member is generally formed with a conductive material.

When the cover member of conductive material and conductive parts that receive or transmit an electric signal are mutually contacted to generate a short-circuit, the short-circuit may ill affect operations of lens driving apparatus such as an operation of auto focusing device and OIS devices, for example.

Hence, a lens driving apparatus and a camera module are required that have a structure capable of effectively interrupt an electric short-circuit between the cover member and the conductive parts. Furthermore, the conventional mobile phone assembly process has suffered from disadvantages in that an optical alignment between a lens driving apparatus and an image sensor is twisted or distorted to degrade performances thereof when a pressure is applied to a bottom side of the lens driving apparatus.

Meantime, a cover member of a lens driving apparatus according to prior art has suffered disadvantages of being erroneously assembled in the course of assembly due to lack of assembly directivity relative to a base.

Technical Subject

In order to solve the abovementioned problems/disadvantages, exemplary embodiments of the present invention provide a lens driving apparatus having a sturdy structure capable of withstanding an outside impact, and a camera module including the lens driving apparatus and an optical instrument.

Exemplary embodiments of the present invention provide a lens driving apparatus having a structure capable of effectively interrupting generation of electric short-circuit between a cover member and conductive parts, and a camera module including the lens driving apparatus.

Exemplary embodiments of the present invention provide a lens driving apparatus having a structure capable of preventing a performance change caused by pressing of the lens driving apparatus.

Exemplary embodiments of the present invention provide a lens driving apparatus capable of preventing an erroneous insertion of cover member.

Technical problems to be solved by the present invention are not restricted to the above-mentioned, and any other technical problems not mentioned so far will be clearly appreciated from the following description by skill in the art.

Technical Solution

A lens driving apparatus according to an exemplary embodiment of the present invention, comprising: a housing; a bobbin disposed inside the housing so as to move in a first direction; a first coil disposed on an outer circumferential surface of the bobbin; a first magnet disposed on the housing and facing the first coil; an upper elastic member disposed on the upper side of the bobbin and coupled to the bobbin and the housing; a base disposed on a lower side of the housing; a substrate disposed between the housing and the base and including a circuit member having a second coil disposed to be opposite to the first magnet; and a support member connected to the upper elastic member and the substrate, wherein the support member includes a first coupling part coupled to the upper elastic member, and wherein the first coupling part is disposed on an upper side of a corner part of housing formed between a first lateral surface and a second lateral surface of housing, and a distance between the first coupling part and the first lateral surface of the housing is different from a distance between the first coupling part and the second lateral surface of housing.

A lens driving apparatus according to an exemplary embodiment of the present invention, comprising: a cover member; a housing disposed inside the cover member; a bobbin disposed inside the housing so as to move in a first direction; a first coil disposed on an outer circumferential surface of the bobbin; a first magnet coupled to the housing; an upper elastic member disposed on the upper side of the bobbin and coupled to the bobbin and the housing; a base disposed on a the lower side of the housing and coupled to the cover member; a substrate disposed between the housing and the base and including a circuit member having a second coil disposed to be opposite to the first magnet; and a plurality of support members connected to the upper elastic member and the substrate; wherein each of the plurality of support members is disposed in the proximity of the edge of the upper elastic member, and wherein the support members are connected to the upper elastic member at a position where a length in the x direction and a length in the y direction are different on the basis of the edge of the upper elastic member.

In some exemplary embodiments, the substrate may further include a PCB (Printed Circuit Board) disposed on a lower side of circuit member and electrically connected to the circuit member.

In some exemplary embodiments, the PCB may include a terminal surface disposed on a lateral surface of the base, and wherein a first discrete distance between the plurality of support members perpendicular to a lengthwise direction of the terminal surface is formed to be shorter than a second discrete distance between the plurality of support members parallel with the lengthwise direction of the terminal surface.

In some exemplary embodiments, the terminal surface may be formed with two pieces, each piece disposed on a mutually opposite side on a lateral surface of base, and wherein a third discrete distance from a lateral surface of the circuit member of a side disposed with the terminal surface to the support member may be formed to be longer than a fourth discrete distance from a lateral surface of circuit member at a side disposed with no terminal surface to the support member, when viewed from an upper side.

In some exemplary embodiments, the support member may be inserted at a lower surface into a through hole disposed on the substrate, and may be coupled with the substrate using a solder.

In some exemplary embodiments, the circuit member may be formed with a through hole inserted by the support member, and wherein the through hole may be formed in the same number as that of the support member.

In some exemplary embodiments, the terminal surface may be formed in two pieces, each piece disposed on a symmetrical position, and wherein a third discrete distance from a side disposed with the terminal surface in each side of the circuit member to the support member may be formed to be longer than a fourth discrete distance from a side disposed with no terminal surface to the support member.

In some exemplary embodiments, the circuit member may take a square shape, and the support member may be disposed on an area where the terminal surface is not belonged to in four areas of the circuit member divided by drawing two diagonal lines including an optical axis from four corners of the circuit member.

In some exemplary embodiments, the cover member may be disposed on both sides of the terminal surface, and may include a first protrusion protrusively formed downwardly of the cover member.

In some exemplary embodiments, the first protrusion may be coupled with a holder member disposed on a lower surface of base.

In some exemplary embodiments, the cover member may include a second protrusion protusively formed to a lower surface of the cover member from a side disposed with no terminal surface on the PCB.

In some exemplary embodiments, the second protrusion may be coupled with the base.

In some exemplary embodiments, the PCB may include a plurality of first terminals connected to the first coil, and a plurality of second terminals connected to the second coil.

In some exemplary embodiments, each of the plurality of first terminals may be symmetrically formed based on a center of the PCB.

In some exemplary embodiments, the plurality of second terminals may be symmetrically formed based on a center of the PCB.

In some exemplary embodiments, the plurality of first terminals and the plurality of second terminals may be formed with the same number of (+) terminals and the same number of (−) terminals.

In some exemplary embodiments, the first terminal includes a total six pieces, and the second terminal may include a total of four pieces.

In some exemplary embodiments, the PCB may include a conductive pattern connecting the first terminal or the second terminal to a terminal formed on the terminal surface.

In some exemplary embodiments, the conductive pattern may include a first conductive pattern formed on an upper surface of the PCB, and a second conductive pattern formed on a lower surface of the PCB, wherein the second conductive pattern may be connected to the terminal formed on the terminal surface through a via hole.

In some exemplary embodiments, the lens driving apparatus may further comprise a bottom elastic member disposed on a lower side of the bobbin and coupled to the bobbin and the housing.

In some exemplary embodiments, an edge of the upper elastic member is an area of the upper elastic member corresponding to an edge of the cover member, and an x-direction length and a y-direction length may be respectively a length measured toward an x-direction and a length measured toward a y-direction from the edge of the upper elastic member to the support member.

In some exemplary embodiments, the support member may be formed in four pieces, and may be formed with an elastic material.

In some exemplary embodiments, a connection part between the support member and the upper elastic member may be disposed on an edge of the housing.

In some exemplary embodiments, a connection part between the support member and the upper elastic member may be disposed on a vicinity of an edge of the cover member.

In some exemplary embodiments, the support member may be disposed on an edge part of housing to elastically support the housing.

In another general aspect of the present invention, there is provided a lens driving apparatus, comprising: a cover member; a housing disposed on an inside of the cover member; a bobbin disposed on an inside of the housing to move to a first direction; a first coil disposed on an outer circumferential surface of bobbin; a first magnet coupled to the housing; an upper elastic member disposed on an upper side of bobbin and coupled to the bobbin and the housing; a lower elastic member disposed on a lower side of the bobbin and coupled to the bobbin and the housing; a base disposed on a lower side of housing and coupled to the cover member; a substrate interposed between the housing and the base and including a circuit member formed with a second coil so disposed as to face the first magnet; and a plurality of support members connected to the upper elastic member and the substrate, wherein each of the plurality of support members is disposed in the proximity of the edge of the cover member, and the support members are connected to the upper elastic member at a position where a length in the x direction and a length in the y direction from the edge of the cover member are different.

In some exemplary embodiments, a camera module may comprise: the lens driving apparatus; and an image sensor mounted on the lens driving apparatus.

In some exemplary embodiments, a mobile device may comprise: a display module including a plurality of pixels that are changed in colors by an electric signal; the camera module converting an image incident through a lens to an electric signal; and a controller controlling the display module and the camera module.

In some exemplary embodiments, a lens driving apparatus may comprise: a bobbin so disposed as to move to a first direction; a first coil disposed on an outer circumferential surface of bobbin; a housing disposed on an inside with the bobbin; a first magnet coupled to the housing; an upper elastic member disposed on an upper side of bobbin to support the bobbin; a lower elastic member disposed on a lower side of bobbin to support the bobbin; a support member disposed on a side surface of housing to support the movement of housing to a second direction and/or a third direction; and a cover member, a part of which is disposed on an upper side of the support member, wherein the cover member may be formed with an escape groove at an area facing the support member to a first direction.

In some exemplary embodiments, a lens driving apparatus may further comprise: a second coil so disposed as to face the first magnet; a base disposed on a lower surface of bobbin; and a PCB accommodated at the base.

In some exemplary embodiments, a lens driving apparatus may further comprise: a soldering part coupling an upper surface of the support member with the upper elastic member, wherein an upper end of the soldering part may be spaced apart from the cover member to a first direction by the escape groove.

In some exemplary embodiments, a lens driving apparatus may further comprise an insulation part filled in the escape groove and formed with an electrically insulated material.

In some exemplary embodiments, the escape groove may be formed by a portion of the cover member being concaved to a first direction.

In some exemplary embodiments, the escape groove may be formed by pressing a portion of cover member.

In some exemplary embodiments, the escape groove may be formed by allowing one surface of cover member to be concaved, and the other surface of cover member to be protruded.

In some exemplary embodiments, the cover member may be formed with a shape of a shape, and may be disposed on an edge area of housing in a plural number.

In some exemplary embodiments, the escape groove may be formed in a plural number at a position of the cover member corresponding to that of support member to a first direction.

In some exemplary embodiments, the upper elastic member may be formed with a soldering coupling part coupled to an upper surface of housing and soldered to an upper surface of the support member, and the housing may be formed at an upper surface with a protrusion protrusively formed at a position adjacent to the soldering coupling part.

In some exemplary embodiments, the soldering coupling part may be formed with a pair of mutually discrete pieces, and the protrusion may be interposed between the pair of soldering coupling parts.

In some exemplary embodiments, the protrusion may prevent the soldering coupling part from being plastically deformed.

A lens driving apparatus according to another exemplary embodiment of the present invention may comprise: a bobbin so disposed as to move to a first direction; a first coil disposed on an outer circumferential surface of bobbin; a housing disposed on an inside of bobbin; a first magnet coupled to the housing; an upper elastic member disposed on an upper side of bobbin to support the bobbin; a lower elastic member disposed on a lower side of the bobbin to support the bobbin; a support member disposed on a side surface of housing to support the movement of housing to a second direction and/or a third direction; and a cover member disposed on an upper surface on an upper side of the support member and formed with an escape groove at an area facing the support member to a first direction, wherein the upper elastic member may be formed with a soldering coupling part coupled to an upper surface of housing and soldered to an upper surface of the support member, and the housing may be formed at an upper surface with a protrusion protrusively formed at a position adjacent to the soldering coupling part.

In some exemplary embodiments, the camera module may include the lens driving apparatus.

A lens driving apparatus according to an exemplary embodiment of the present invention may comprise: a base; a cover member coupled to the base and forming an inner space with the base; a bobbin accommodated into the inner space; a first driving part disposed on the bobbin; a second driving part accommodated into the inner space to face the first driving part; and a support part extended from the cover member to a lower side, wherein a lower end of the support part may face a lower surface of the base or may be disposed on a lower side than the lower surface of the base.

In some exemplary embodiments, the lens driving apparatus may further comprise: a substrate; and a third driving part disposed on the substrate to face the second driving part, wherein the substrate may include a terminal part bent and extended to a lower side along a side surface of the base, and a lower end of the support part may face a lower end of the terminal part or may be disposed on a lower side than a lower end of the terminal part.

In some exemplary embodiments, the terminal part may include a first terminal part disposed on a first side of the substrate, and a second terminal part disposed on a second side disposed on an opposite side of the first side, wherein the support part may include a first support part disposed on the first side on the cover member, and a second support part disposed on the second side on the cover member.

In some exemplary embodiments, the first support part may include a first support lug and a second support lug each spaced apart from the first terminal part to both sides of long side direction of the first terminal part, wherein the second support part may include a third support lug and a fourth support lug each spaced apart from the second terminal part to both sides of long side of the second terminal part, and the first support lug and the third support lug may be symmetrical based on a center of the cover member.

In some exemplary embodiments, the lens driving apparatus may further comprise: a first erroneous insertion prevention part disposed on a lower end of the cover member; and a second erroneous insertion prevention part disposed on the base to be coupled to the first erroneous insertion prevention part, wherein the first erroneous insertion prevention part may have an uncorresponding shape based on a center of the cover member.

In some exemplary embodiments, the first erroneous insertion prevention part may include a protrusion protruding from a lower end of the cover member to a lower side, and the second erroneous insertion prevention part may include a reception part recessed inwardly from a side surface of base to include the protrusion.

In some exemplary embodiments, the protrusion may include a first lug disposed on a side plate of one side at the cover member, and a second lug disposed on a side plate of the other side at the cover member, and the reception part may include a first groove having a shape corresponding to that of the first lug to accommodate the first lug, and a second groove having a shape corresponding to that of the second lug to accommodate the second lug.

In some exemplary embodiments, the first erroneous insertion prevention part may include a concave part recessed from a lower end of the cover member to an upper side, and the second erroneous insertion prevention part may include an insertion part protruded from the base to be accommodated into the concave part.

In some exemplary embodiments, the lens driving apparatus may further comprise: a substrate disposed on the base; and a third driving part disposed on the substrate to face the second driving part, wherein the substrate may be formed with a ground pad part contacting the protrusion, and the cover member may contain a metal material.

In some exemplary embodiments, the lens driving apparatus may further comprise a direction indication marking formed the cover member to be exposed to the outside.

A camera module according to an exemplary embodiment of the present invention may comprise: a base; a cover member coupled to the base and forming an inner space with the base; a bobbin accommodated into the inner space; a first driving part disposed on the bobbin; a second driving part accommodated into the inner space to face the first driving part; and a support part extended from the cover member to a lower side, wherein a lower end of the support part may face a lower surface of the base or may be disposed on a lower side than the lower surface of the base.

In some exemplary embodiments, the camera module may further include a PCB mounted with an image sensor and disposed with the base, wherein the support part may be coupled to the PCB using a solder, or fixed to the PCB using an active alignment bond.

An optical instrument according to an exemplary embodiment of the present invention may comprise: a base; a cover member coupled to the base and forming an inner space with the base; a bobbin accommodated into the inner space; a first driving part disposed on the bobbin; a second driving part accommodated into the inner space to face the first driving part; and a support part extended from the cover member to a lower side, wherein a lower end of the support part may face a lower surface of the base or may be disposed on a lower side than the lower surface of the base.

Advantageous Effects

The support member in the exemplary embodiment may be disposed on the circuit member to allow a discrete distance from a side arranged with a terminal surface among sides of circuit member is longer than a discrete distance from a side where the terminal surface is not disposed, whereby disconnection and damage to the support member caused by an external impact can be restricted.

The exemplary embodiment of the present invention includes a plurality of first print terminals and a plurality of second print terminals, whereby the first coil and the second coil may be restricted from being disconnected with outside power due to damage to the PCB.

The first protrusion and the second protrusion in the exemplary embodiment of the present invention may restrict the movement of PCB to allow the coupling between a terminal of PCB and terminal of holder member using a soldering and electric connection works to be easily implemented.

The escape groove in the exemplary embodiment of the present invention formed on the cover member may prevent an electric short-circuit between the support member and the cover member, whereby malfunction of lens driving apparatus caused by the electric short-circuit and degraded screen of photographed image can be prevented.

The housing may be formed with the protrusion in the exemplary embodiment of the present invention to effectively prevent the plastic deformation of the soldering coupling part that may be generated when the upper elastic member is coupled to the housing.

The changes in performances caused by depression of lens driving apparatus may be prevented through the exemplary embodiment of the present invention.

Furthermore, the cover member may be prevented from being coupled to the base in an erroneous insertion state.

Moreover, the phenomenon of coupling with inconsistent directivity can be prevented that may occur in the process of the lens driving apparatus coupled with the cover member being coupled to the PCB of camera module.

BEST MODE

Figure 1:
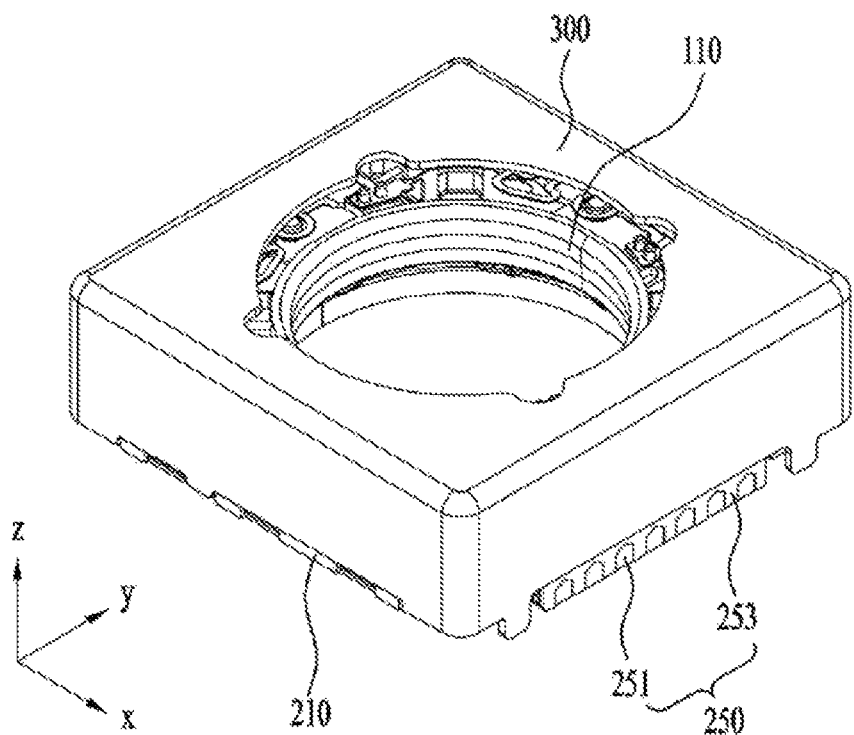
FIG. 1 is a perspective view illustrating a lens driving apparatus according to a first exemplary embodiment of the present invention.

Some of the exemplary embodiments of the present invention will be described with the accompanying drawings. Throughout the descriptions, the same reference numerals will be assigned to the same elements in the explanations of the figures.

Furthermore, the terms "first," "second," "A", "B", (a), (b) and the like may be used in explanation of elements according to exemplary embodiments of the present invention. These terms are used merely to distinguish one element from another and do not limited to essences, orders or sequences of relevant elements by the relevant terms. When an element is 'connected', 'coupled' or 'joined' to other elements, the element may be directly connected, coupled or joined, but it should be appreciated that 'connected', 'coupled' or 'joined' may mean that two or more elements are 'connected', 'coupled' or 'joined' together via another element or intermediate elements.

An "optical axis direction" as used hereinafter may be defined as an optical axis direction of a lens module in a state of being coupled to a lens driving device. Meantime, the "optical axis direction" may be interchangeably used with "vertical direction" and "z axis direction" and the like.

An "auto focus function" as used hereinafter may be defined as a function of automatically matching a focus relative to an object by adjusting a distance from an image sensor by moving a lens module to an optical axis direction. Meantime, the "auto focus" may be interchangeably used with "AF".

A "handshake correction function" as used hereinafter may be defined as a function of moving or tilting a lens module to a direction perpendicular to an optical axis direction in order to offset vibration (movement) generated on the image sensor by an outer force. Meantime, the "handshake correction" may be interchangeably used with an "OIS (Optical Image Stabilization)".

Moreover, an orthogonal coordinate system (x, y, z) may be in the drawings. x axis and y axis in the drawings may be defined as a plane surface perpendicular to an optical axis, and, for convenience sake, an optical axis (z axis direction) may be defined as a first direction, x axis direction may be defined as a second direction, and y axis direction may be defined as a third direction.

Figure 2:
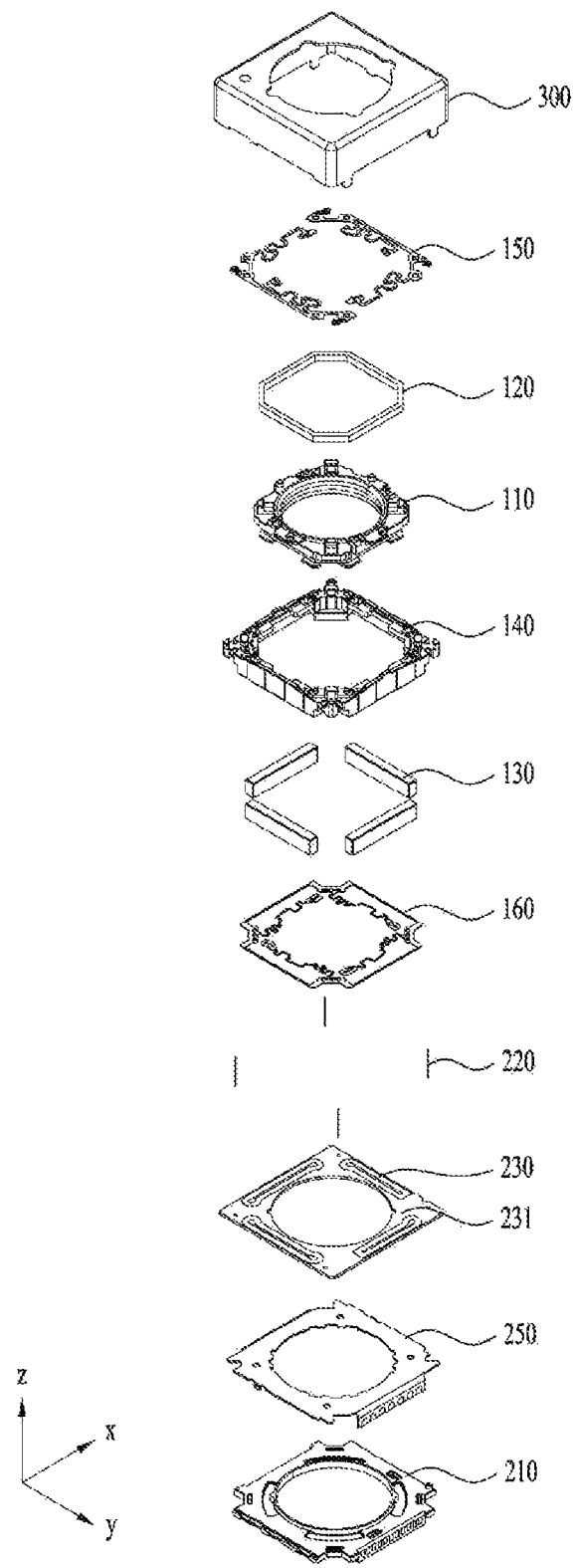
FIG. 2 is an exploded perspective view illustrating a lens driving apparatus according to a first exemplary embodiment of the present invention.

FIG. 1 is a perspective view illustrating a lens driving apparatus according to a first exemplary embodiment of the present invention, and FIG. 2 is an exploded perspective view illustrating a lens driving apparatus according to a first exemplary embodiment of the present invention.

An auto focusing device applied to a small camera of a mobile device like a smart phone or a tablet PC is a device automatically capturing a focus of an image of a subject on a surface of an image sensor (not shown). The auto focusing device may be variably formed, and in the exemplary embodiments of the present invention, an optical module formed with a plurality of lenses may be moved to a first direction to perform the auto focusing operation.

Referring to FIG. 2, the lens driving apparatus according to a first exemplary embodiment of the present invention may include a mover and a stator. At this time, the mover may perform an auto focusing function of a lens. The mover may include a bobbin (110) and a first coil (120), and the stator may include a first magnet (130), a housing (140), an upper elastic member (150) and a lower elastic member (160).

The bobbin (110) may be disposed on an inside of the housing so as to move to a first direction, may be disposed on an outer circumferential surface with a first coil (120) disposed on an inside of the first magnet (130), and may be reciprocally disposed on an inner space of the housing (140) to the first direction by an electromagnetic interaction between the first magnet (130) and the first coil (120). The bobbin (110) may be disposed on an outer circumferential surface with the first coil (120) to enable an electromagnetic interaction with the first magnet (130).

Furthermore, the bobbin (110) may be elastically supported by the upper and lower elastic members (150, 160) to move to the first direction whereby auto focusing function can be implemented. The bobbin (110) may include a lens barrel (not shown) disposed on an inside with at least one lens. The lens barrel may be coupled to an inside of the bobbin (110) by way of variable methods. For example, a female screw may be formed at an inner circumferential surface of the bobbin (110), and a male screw corresponding to the female screw may be formed at an outer circumferential surface of the lens barrel and the female screw and the male screw may be screw-connected and coupled to the bobbin (110). However, the present invention is not limited thereto, and the inner circumferential surface of bobbin (110) may not be formed with screw threads, and the lens barrel may be directly fixed to an inside of the bobbin (110) using various other methods than the screw connection. Alternatively, one or more lenses may be integrally formed with the bobbin (110) free from the lens barrel.

The lens coupled to the lens barrel may be formed with one sheet, or may be so formed as to constitute an optical system where two or more lenses are formed. The auto focusing function may be controlled by a current direction and/or current amount, where the auto focusing function may be embodied by an operation of moving the bobbin (110) to the first direction.

For example, when a forward current is applied, the bobbin (110) may move to an upper side from an initial position, and when a backward current is applied, the bobbin (110) may move to a lower side from the initial position. Alternatively, a movement distance can be increased or decreased to one direction from the initial position by adjusting a current amount of one direction.

The bobbin (110) may be protrusively formed at an upper surface and a lower surface with a plurality of upper support lugs and lower support lugs. The upper support lug may be provided in a cylindrical shape or a square column shape, and may be coupled and fixed with the upper elastic member (150) by guiding the upper elastic member (150). The lower support lug may be also provided in a cylindrical shape or a square column shape as the upper support lug, and may be coupled and fixed with the lower elastic member (160) by guiding the lower elastic member (160). The upper elastic member (150) may be disposed on an upper side of bobbin (110), and the lower elastic member (160) may be disposed on a lower side of bobbin (110), and may be respectively coupled to the bobbin (110) and the housing (140). At this time, the upper elastic member (150) may be formed with a through hole and/or groove corresponding to the upper support lug, and the lower elastic member (160) may be formed with a through hole and/or groove corresponding to the lower support lug. Each of the support lugs and the through hole and/groove may be fixedly coupled by thermal fusion or an adhesive member such as epoxy.

The housing (140) may take a hollow-holed pillar shape supporting the first magnet (130), and substantially formed with a square shape and may be disposed on an inside of the cover member (300). The housing (140) may be disposed on a side surface with the first magnet (130) that is coupled to the housing (140). Furthermore, as mentioned above, the housing (140) may be disposed on an inside thereof with the bobbin (110) that moves to the first direction by being guided to the upper and lower elastic members (150, 160).

The first magnet (130) in one exemplary embodiment may have a shape of a rod and may be coupled or disposed on a surrounding of a side of the housing (140). In another exemplary embodiment, the first magnet (130) may have a trapezoidal shape and may be coupled or disposed on an area of an edge of the housing (140). Meantime, the first magnet (130) may be formed in one piece or two or more pieces. Furthermore, the first magnet (130) may be formed in a multi-layered structure where a plural number of first magnets (130) may be arranged to the first direction.

The upper and lower elastic members (150, 160) may elastically support up and/or down operations of bobbin (110) to the first direction. The upper elastic member (150) and the lower elastic member (160) may be formed with a leaf spring.

As illustrated in FIG. 2, the upper elastic member (150) may be formed with two pieces each separated. Through this bifurcated structure, each divided upper elastic member (150) may be applied with a current of mutually different polarity or with mutually different powers or may become a current transfer path.

Furthermore, in a modification, the lower elastic member (160) may be formed with two pieces each separated, and the upper elastic member (150) may be integrally formed. Meantime, the upper elastic member (150), the lower elastic member (160), the bobbin (110) and the housing (140) may be assembled through thermal fusion and/or a bonding operation using an adhesive. At this time, for example, the fixing operation may be finished by bonding using an adhesive after thermal fusion fixation.

The base (210) may be disposed on a lower side of bobbin (110) and PCB (250) and may be substantially provided with a square shape, and may be accommodated by a PCB (250). A surface opposite to an area formed with a terminal surface (253) of the PCB (250) of base (210) may be formed with a support groove of corresponding size. Furthermore, the base (210) may be disposed on a lower side of the housing (140) to be coupled with the cover member (300).

The support groove may be recessed inwardly at a predetermined depth from an outer circumferential surface of base (210) to prevent an area formed with the terminal surface (253) from protruding to outside or to adjust a protruding amount.

A support member (220) may be disposed on a corner part of housing (140), an upper side being coupled to the upper elastic member (150) and a lower side being coupled to a substrate including the base (210), the PCB (250) and a circuit member (231), and may support the bobbin (110) and the housing (140) so that the bobbin (110) and the housing (140) can move to a second direction and/or a third direction and may be electrically connected to the first coil (120).

The support member (220) may elastically support the housing (140) by being disposed on the corner part of housing (140). The support member (220) may be disposed in a plural number, and each of the support members (220) in an exemplary embodiment may be disposed on an edge, i.e., at a corner part of the housing (140), with a total of four support members (220). The support member (220) may be formed with an elastically-deformable material to allow the bobbin (110) and the housing (140) to move on an x-y plane. Alternatively, the support member (220) in another exemplary embodiment may be disposed in a total of six pieces, two support members each on two corner parts, and one support member each on remaining two corner parts, a total six support members. Alternatively, the support member (220) may be disposed in a total of seven pieces, or in a total of nine pieces, depending on circumstances.

Moreover, the support member (220) may be electrically connected to the upper elastic member (150). That is, for example, the support member (220) may be electrically connected to an area where a through hole of the upper elastic member (150) is formed. Furthermore, the support member (220) may be formed separate from the upper elastic member (150), whereby the support member (220) and the upper elastic member (150) can be electrically connected using a conductive adhesive agent, soldering or welding. Thus, the upper elastic member (150) can apply a current to the first coil (120) through the electrically-connected support member (220).

The support member (220) may be inserted at a lower end into a through hole formed on the substrate including the circuit member (231) and the PCB (250), and coupled to the substrate by being soldered. That is, the support member (220) may be electrically connected to the substrate by being inserted and soldered at a lower end into a through hole formed at the circuit member (231) and/or the PCB (250). Alternatively, the support member (220) may be electrically soldered to an area corresponding to the circuit member (231), while the circuit member (231) and/or the PCB (250) are not formed with a through hole.

Meanwhile, although FIG. 2 has not illustrated the linear support member (220) as a first exemplary embodiment, the present invention is not limited thereto. That is, the support member (220) may be also formed with a shape of a plate member.

A second coil (230) can move the housing (140) to a second direction and/or a third direction through an electromagnetic interaction with the first magnet (130), whereby the support member (220) can perform the OIS function through the elastic deformation. Here, the second direction and/or the third direction may include not only x axis (or first direction) direction and y axis (or second direction), but also directions substantially close to x axis direction and y axis direction. That is, in the prospective of driving aspect in the exemplary embodiment, the housing (140) may move in parallel with the x axis and y axis directions, but may also move slightly slanted to the x axis and y axis directions when moving by being supported by the support member (220).

Thus, there is a need of the first magnet (130) being disposed on a position corresponding to the second coil (230).

The second coil (230) may be so disposed as to face the first magnet (130) fixed to the housing (140). In an exemplary embodiment, the second coil (230) may be disposed on an outside of the first magnet (130). Alternatively, the second coil (230) may be disposed by being spaced apart from a lower side of the first magnet (130) at a predetermined distance. According to an exemplary embodiment, the second coil (230) may be disposed with a total of four pieces, each at four side areas of the circuit member (231). However, the present invention is not limited thereto, and a total of two pieces, one for second direction and one for third direction, may be installed and more than four pieces may be also installed. Alternatively, one at a first side for second direction, two at a second side for second direction, one at a third side for third direction and two at a fourth side for third direction, a total of six pieces may be also installed. Alternatively, in this case, first side and the fourth side may be adjacent, and the second side and the third side may be adjacently disposed.

In an exemplary embodiment, the circuit member (231) may be formed with a circuit pattern in a shape of the second coil (230), and a separate second coil may be disposed on an upper surface of circuit member (231). However, the present invention is not limited thereto, and a circuit pattern in the shape of second coil (230) may be directly formed on an upper surface of circuit member (231).

Alternatively, the second coil (230) may be formed in a shape of a doughnut by winding a wire, or formed in a shape of an FP coil to allow being electrically connected to the PCB (250).

The circuit member (231) including the second coil (230) may be installed or disposed on an upper surface of the PCB (250) disposed on an upper side of the base (210). However, the present invention is not limited thereto, and the second coil (230) may be closely disposed with the base (210), may be spaced apart from the base (210), or may be formed on a separate substrate which may be stacked and connected to the PCB (250). The substrate may be interposed between the housing (140) and the base (210), and may include a circuit member (231) and a PCB (250). At this time, the circuit member (231) and the PCB (250) may be electrically connected. The circuit member (231) may include a second coil (230) so disposed as to face the first magnet (130) and may be disposed on an upper side of the PCB (250).

The PCB (250) may be disposed on a lower side of circuit member (231), may be electrically connected to at least one of the upper elastic member (150) and the lower elastic member (160), and may be coupled to an upper surface of the base (210) and may be formed at a position corresponding to a distal end of the support member (220) with a through hole inserted by the support member (220). Alternatively, the through hole may not be formed to allow being electrically connected or bonded to the support member.

In another exemplary embodiment, when the support member (220) is coupled to the circuit member (231), a corner part corresponding to the support member (220) of the PCB (250) may be formed with an escape part in order to facilitate the coupling work such as soldering between the support member (220) and the circuit member (231). The PCB (250) may be coupled to an upper surface of base (210) to be disposed on a lower side of circuit member (231), and may be electrically connected to the circuit member (231). The PCB (250) may be disposed on a side surface of base (210) to form a terminal surface (253) mounted with a terminal (251). The exemplary embodiment has illustrated the PCB (250) formed with two bent terminal surfaces (253).

The terminal surface (253) may be disposed with a plurality of terminals (251) to supply a current to the first coil (120) and to the second coil (230) by receiving the current from an outside power source. The number of terminals (251) formed on the terminal surface (253) may be increased or decreased depending on types of elements that are required. Furthermore, the PCB (250) may be formed with one or more than two terminal surfaces (253).

The cover member (300) may be provided in a box shape formed with corners, may accommodate a portion or all of the mover, the second coil (230) and the PCB (250), and may be coupled with the base (210). The cover member (300) may protect the mover, the second coil (230) and the PCB (250) accommodated therein from being damaged. Furthermore, the cover member (300) may additionally limit an electromagnetic field generated by the first magnet (130), the first coil (120) and the second coil (230) from being leaked to outside to allow an electromagnetic field to be collected.

Figure 3:
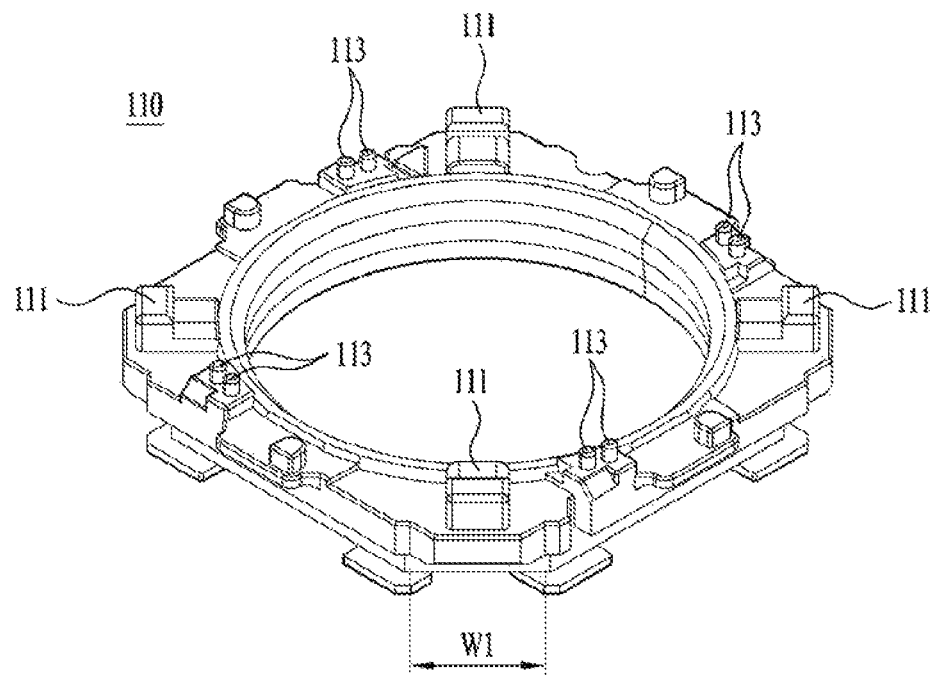
FIG. 3 is a perspective view illustrating a bobbin according to a first exemplary embodiment of the present invention.
Figure 4:
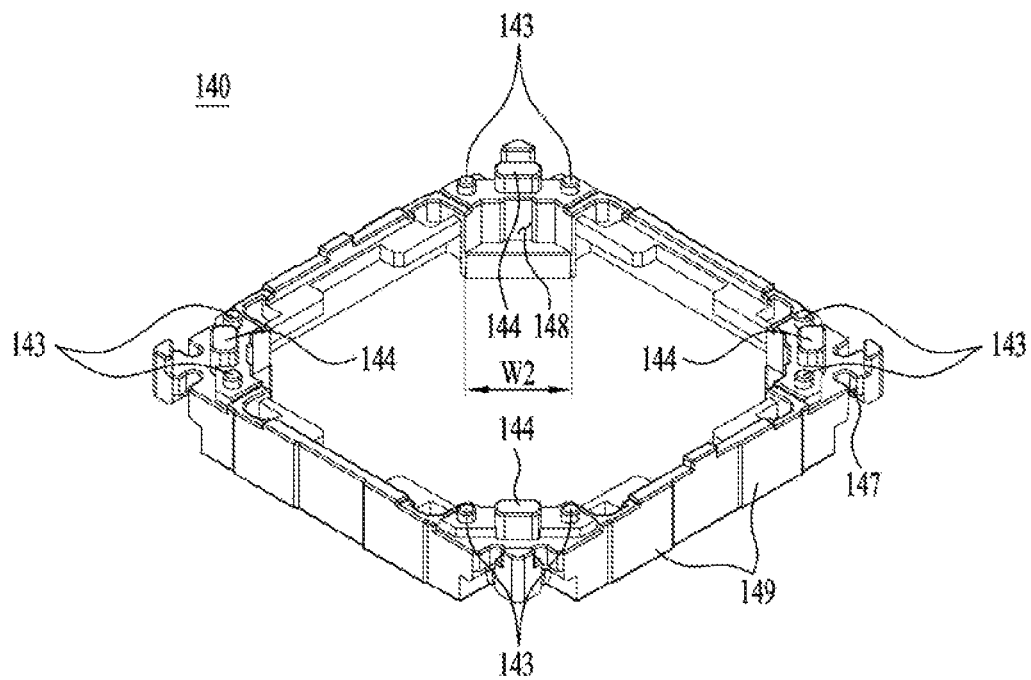
FIG. 4 is a perspective view illustrating a housing according to a first exemplary embodiment of the present invention.

FIG. 3 is a perspective view illustrating a bobbin according to a first exemplary embodiment of the present invention, and FIG. 4 is a perspective view illustrating a housing according to a first exemplary embodiment of the present invention.

Hereinafter, structure of bobbin (110) and housing (140) will be described in more detail with reference to FIGS. 3 and 4. FIG. 3 is a perspective view illustrating a bobbin (110) according to a first exemplary embodiment of the present invention.

The bobbin (110) may include a first upper support lug (113) and a third protrusion (111). The first upper support lug (113) may be formed in a cylindrical shape or other shapes, and may guide the upper elastic member (150) to allow the upper elastic member (150) to be coupled to the bobbin (110).

The third protrusion (111) may be formed by being protruded from an upper surface of bobbin (110). An upper surface of the third protrusion (111) may hit a lower surface of the cover member (300) to prevent a plastic deformation exceeding an elastic limitation of spring when an outside shock is generated.

When an initial position of the bobbin (110) is set at a position where the bobbin (110) cannot descend any more, the auto focusing of bobbin (110) may be realized by a single direction control. That is, the auto focusing function may be implemented in a method where the bobbin (110) rises when a current supplied to the first coil (120) increases, and the bobbin (110) gradually descends to return to an initial position when the supplied current decreases.

However, when the initial position of bobbin (110) is so set as to have a discrete distance where the bobbin (110) can descend, the auto focusing of bobbin (110) may be implemented by bi-directional control. That is, the auto focusing function may be realized through an operation of upwardly or downwardly moving the bobbin (110) to a first direction. For example, when a forward current is applied, the bobbin (110) may move upwardly and when a reverse current is applied, the bobbin (110) may downwardly move.

FIG. 4 is a perspective view illustrating a housing (140) according to a first exemplary embodiment of the present invention.

The housing (140) may support a magnet (130) and may accommodate therein the bobbin (110) moving to the first direction. The housing (140) may generally take a hollow-holed pillar shape. For example, the housing (140) may be formed with a hollow hole of polygonal shape (e.g., square or pentagon) or round shape. The housing (140) may include a second upper support lug (143) and a fourth protrusion (144). The second upper support lug (143) is an area where the through hole formed at the upper elastic member (150) is coupled. The second upper support lug (143) may take a cylindrical shape or other various shapes, and may guide the upper elastic member (150) to allow the upper elastic member (150) to be coupled to the housing (140).

The fourth protrusion (144) may be formed by protruding from an upper surface of housing (140). The fourth protrusion (144) may perform a function of stopping the cover member (300) and a body of housing (140). That is, an upper surface of the fourth protrusion (144) may be made to hit a lower surface of the cover member (300), when an outside shock is generated, to prevent the cover member (300) and the body of housing (140) from mutually and directly colliding. The housing (140) may be formed at a position corresponding to an area formed with a first width (W1) of the bobbin (110) with a third recess part (148). A surface of the third recess part (148) of the housing (140) facing the bobbin (110) may have a shape joined with the first width (W1), which is an area protrusively formed from the bobbin (110). At this time, the first width (W1) of the bobbin (110) illustrated in FIG. 3 and a second width (W2) of the third recess part (148) of housing (140) illustrated in FIG. 4 may have a predetermined tolerance.

The bobbin (110) may be prevented from rotating relative to the housing (140) by allowing the third recess part (148) to be so disposed as to join the first width (W1) of the bobbin (110). As a result, the third recess part (148) of the housing (140) may prevent the bobbin (110) from rotating even if a force is received to allow the bobbin (110) to rotate about an optical axis or an axis parallel with the optical axis.

Figure 5:
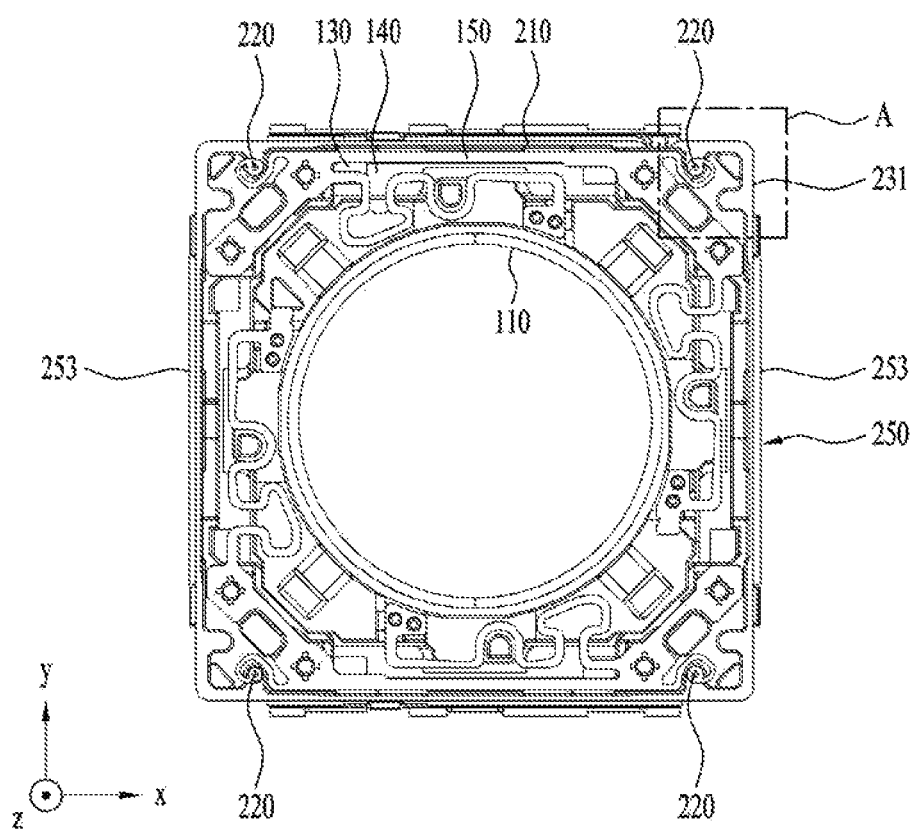
FIG. 5 is a plane view removed of a cover member in FIG. 1.
Figure 6:
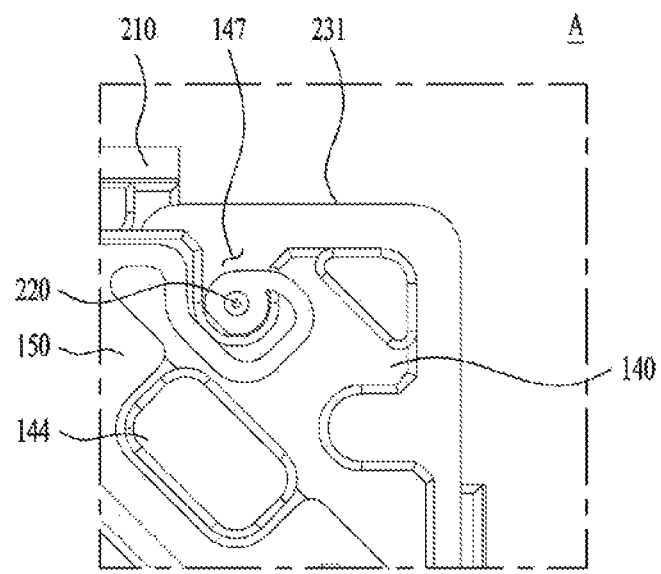
FIG. 6 is an enlarged view of 'A' area in FIG. 5.

Furthermore, a corner part of housing (140) may be formed with a second recess part (147). The support member (220) may pierce the second recess part (147) to a first direction to be connected to the upper elastic member (150). A pair of second recess parts (147) may be respectively formed at the corner part of housing (140), as illustrated in FIGS. 5 and 6. In an exemplary embodiment, the support member (220) may be so disposed as to pierce any one of the pair of second recess parts (147) formed at one of the corner parts of housing (140).

In another exemplary embodiment, only one second recess part (147) may be formed on each corner part of housing (140). For example, as illustrated in FIG. 6, and when viewed from the paper, the second recess part (147) may be formed only on a left upper side pierced by the support member (220) in the corner part of the housing (140), and the second recess part (147) may not be formed on the right lower side. In another exemplary embodiment, the corner part of housing (140) may be formed with a through hole pierced by the support member (140) instead of the second recess part (147). One pair of through holes or one through hole may be formed on the corner part of housing (140), as in the second recess part (147).

Meantime, the housing (140) may be formed at a lower surface of a corner area of housing (140) with a lower support lug (not shown) in order to be coupled with the lower elastic member (160). The lower support lug may be formed in a shape corresponding to a position corresponding to the upper support lug. However, the present invention is not limited thereto. The housing (140) may be formed with a plurality of third stoppers (149) protruded from a lateral part of each side. The third stopper (149) may function to prevent the housing (140) from colliding with the cover member (300) when the housing (140) moves to the second and third directions.

FIG. 5 is a plane view removed of a cover member in FIG. 1, and FIG. 6 is an enlarged view of 'A' area in FIG. 5. The support member (220) in the exemplary embodiment may function as a lead wire electrically connecting the PCB (250) with the first coil (120). For example, both distal ends of the first coil (120) may be electrically connected to the upper elastic member (150), the upper elastic member (150) may be electrically connected to the support member (220), the support member (220) may be electrically connected to the circuit member (231), and the circuit member (231) may be electrically connected to the PCB (250) to allow the first coil (120) to be electrically connected to the PCB (250).

In another exemplary embodiment, the upper elastic member (150) may not be electrically connected to the circuit member (231) and directly connected to the PCB (250) to allow the first coil (120) and the PCB (250) to be electrically connected.

As illustrated in FIG. 6, a connection part between the support member (220) and the upper elastic member (150) may be formed at a corner of the housing (140). Furthermore, a connection part between the support member (220) and the upper elastic member (150) may be formed at a corner of the cover member (300).

At this time, as illustrated in FIG. 6, a through hole inserted by the support member (220) may be formed at an area of upper elastic member (150) corresponding to an area disposed with the support member (220), the support member (220) and the through hole area are soldered after the support member (220) is inserted into the through hole, and then the support member (220) and the upper elastic member (150) may be electrically connected.

At this time, one of two distal ends of the first coil (120) may be a (+) terminal and the other end may be a (−) terminal. Thus, by using two ends of four support members (220) in the exemplary embodiment, one may be connected to the (+) terminal of first coil (120), and the other one may be connected to the (−) terminal. In this case, the upper elastic member (150) may be formed in a bifurcated structure lest the (+) terminal (120) and the (−) terminal of first coil (120) be short-circuited. Alternatively, two support members (220) may be connected to the (+) terminal of the first coil (120), and the remaining two support members (220) may be connected to the (−) terminal of first coil (120).

In another exemplary embodiment, when the first coil (120) is doubly wound or provided in two pieces, the first coil (120) may have two (+) terminals and two (−) terminals. Thus, by using all four support members (220) in the exemplary embodiment, two support members (220) may be connected to the (+) terminal of the first coil (120) and the remaining two support members (220) may be connected to the (−) terminal of the first coil (120). In this case, the upper elastic member (150) may be formed in a quadruplicated structure lest each terminal including the (+) terminals and the (−) terminals of first coil (120) be short-circuited. At this time, the electric resistance can be reduced by connecting in parallel the support members (220) with the same polarity in the quadruplicated upper elastic member (150), and the electromagnetic force generated from between the first coil (120) and the first magnet can be increased by increasing the number of winding and by serially connecting the doubly wound first coil (120).

In still another exemplary embodiment, the PCB (250) and the first coil (120) may be electrically connected by using the support member (220) and the lower elastic member (160). That is, both ends of first coil (120) may be electrically connected to the lower elastic member (160), the lower elastic member (160) may be electrically connected to the support member (220), the support member (220) may be electrically connected to the circuit member (231), and the circuit member (231) may be electrically connected to the PCB (250), whereby the first coil (120) and the PCB (250) may be electrically connected.

In this case, a structure similar to the above explanation on the upper elastic member (150) may be used.

In still another exemplary embodiment, a portion of distal ends of the first coil (120) may be electrically connected to the upper elastic member (150), and remaining distal ends may be electrically connected to the lower elastic member (160) to allow a current to be applied to the first coil (120) from the PCB (250). The first coil (120) may be electrically connected to the PCB (250) through the upper elastic member (150), and/or the lower elastic member (160) and the support member (220). Thus, the first coil (120) may receive a current from the electrically connected PCB (250) to perform an electromagnetic interaction with the first magnet (130), whereby the bobbin (110) can be moved to the first direction, and the lens driving device can perform the auto focusing function.

Referring to FIGS. 5 and 6, each of the plurality of support members (220) may be respectively disposed around a corner of the upper elastic member (150). At this time, the support member (220) may be connected to the upper elastic member (150) at an area where an x direction length and a y direction length are mutually different about the corner of the upper elastic member (150).

The corner of the upper elastic member (150) may be an area of the upper elastic member (150) corresponding to a corner of the cover member (300). Furthermore, the x direction length may be a length measured to the x direction from the corner of the upper elastic member (150) to the support member (220), and the y direction length may be a length measured to the y direction from the corner of upper elastic member (150) to the support member (220).

In other words, the plurality of support members (220) is respectively disposed about the corner of the cover member (300), and the support member (220) may be connected to the upper elastic member (150) at an area (position) where each length measured from the corner of cover member (300) to the support member (220) to the x direction and the y direction are mutually different. The arrangement position of the support member (220) will be explained in more detail with reference to the accompanying drawings.

Referring to FIGS. 5 and 6, the support member (220) may include a first coupling part coupled to the upper elastic member (150). Furthermore, the first coupling part may be disposed on an upper side of a corner of housing (140) formed between a first side surface and a second side surface of housing (140). At this time, a distance between the first coupling part and the first side surface of housing (140) may be different from a distance between the first coupling part and the second side surface of the housing (140).

Figure 7:
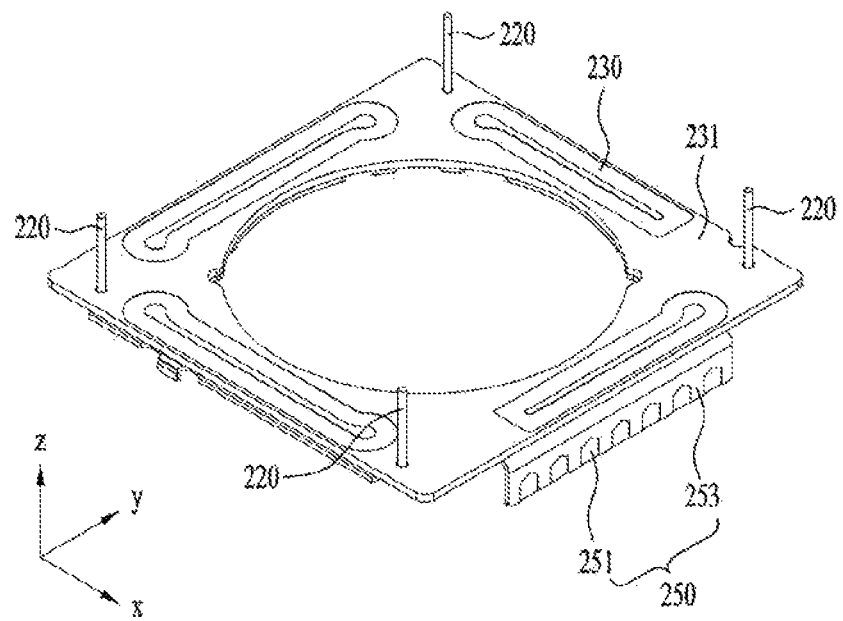
FIG. 7 is a schematic view illustrating an arrangement of support member, circuit member and PCB according to a first exemplary embodiment of the present invention.
Figure 8:
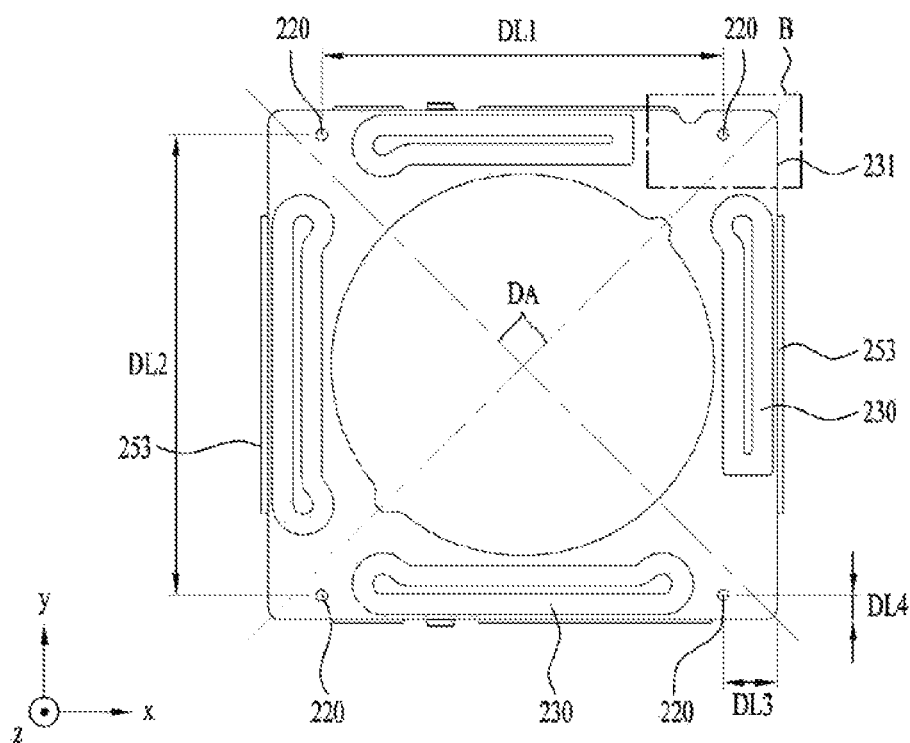
FIG. 8 is a plane view of FIG. 7.
Figure 9:
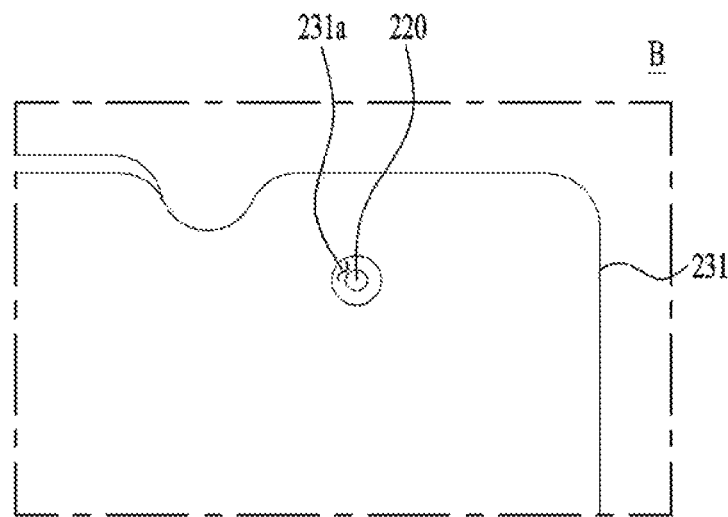
FIG. 9 is an enlarged view of 'B' area in FIG. 8.

FIG. 7 is a schematic view illustrating an arrangement of support member, circuit member and PCB according to a first exemplary embodiment of the present invention, FIG. 8 is a plane view of FIG. 7, and FIG. 9 is an enlarged view of 'B' area in FIG. 8.

In an exemplary embodiment, the support member (220) may be inserted at a lower end into the circuit member (231) and coupled to the circuit member (231) by being soldered, whereby the support member (220) and the circuit member (231) can be electrically connected.

As illustrated in FIG. 9, the circuit member (231) may be formed with a through hole (231a) inserted by the support member (220). In the exemplary embodiment, the support member (220) may be formed in a total of four pieces, and the through hole (231a) may be formed in the same number as the support member (220), that is, in a total number of four pieces. In the exemplary embodiment, a lower end of the support member (220) may be inserted into the through hole (231a), and the support member (220) and the circuit member (231) may be mutually soldered at an area of the through hole (231a), whereby the support member (220) and the circuit member (231) may be mutually coupled and electrically connected.

Furthermore, mutual coupling and electrical connection between the circuit member (231) and the support member (220) may enable the support member (220) and the PCB (250) to be electrically connected. Furthermore, in order to facilitate the soldering work between the support member (220) and the circuit member (231), an area of the PCB (250) corresponding to an area where the support member (220) is disposed may be formed with an escape structure.

As illustrated in FIGS. 7 and 8, the plurality of support members (220) is such that a first discrete distance (DL1) between the support members (220) perpendicular to a lengthwise direction of the terminal surface (253) may be formed to be shorter than a second discrete distance (DL2) between the support members (220) parallel with a lengthwise direction of the terminal surface (253). Thus, the terminal surface (253) in the exemplar embodiment may be formed in two pieces each disposed on an opposite side, and two terminal surfaces (253) may be disposed on a side surface of base (210). At this time, when the lens driving device is seen from an upper side, a third discrete distance (DL3) from a side surface of circuit member (231) at a side where the terminal surface (253) is disposed to the support member (220) may be formed to be longer than a fourth discrete distance (DL4) from a side surface of the circuit member (231) at a side where the terminal surface (253) is not formed to the support member (220).

In other words, the terminal surface (253) in the exemplary embodiment may be formed in two pieces at mutually symmetrical positions, and the third discrete distance (DL3) from a side disposed with the terminal surface (253) among each side of the circuit member (231) to the support member (220) may be formed to be longer than the fourth discrete distance from a side where the terminal surface (253) is not formed to the support member (220). To put it differently, the circuit member (231) may take a square shape when viewed from the first direction, and the plurality of support members (220) may be disposed on an area where the terminal surface (253) is not disposed among four pieces of support members (220) divided by two diagonal lines (DA) on the circuit member (231) to allow passing through a center of the circuit member (231).

That is, the support member (220) may be disposed on an area not belonged by the terminal surface (253) of the PCB (250) among the four areas of the circuit member (231) divided by drawing a diagonal line (DA) including an optical axis from four corners of the circuit member (231). The circuit member (231) may be disposed with a second coil (230), and may be disposed with a circuit having a complex structure. Furthermore, the PCB (250) surface-contacting the circuit member (231) may be also disposed with a circuit having a complex structure.

Thus, it is proper that the support member (220) be disposed on a corner part between the circuit member (231) and the PCB (250), in order to facilitate to dispose many complex structure, such as the circuit member (231), the PCB (250) and the second coil (230), i.e., in order to increase the spatial utilization of PCB (250). However, when the support member (220) is disposed on a corner part of circuit member (231), and when an repetitive and continuous outside shocks are applied to the lens driving device, the corner part may be applied with a stronger shock than an inner area of the circuit member (231), whereby the support member (220) disposed on the corner part may be applied with a stronger shock to thereby disconnect or damage the support member (220).

When the support member (220) is disconnected or damaged, the OIS function of the lens driving device performed by elastic deformation of the support member (220) may be rendered to be impossible, or conversely, the support member (220) may be generated with an oscillation phenomenon of being greatly trembled. Thus, in order to restrict the support member (220) from being disconnected or damaged, the support member (220) may be required to be disposed on a position moved to an inner side from the corner part of circuit member (231).

Particularly, the terminal surface (253) directly exposed to the outside may be directly applied with an outside shock, and the shock applied to the terminal surface (253) may be directly transferred to the circuit member (232) connected thereto. Furthermore, when the PCB (250) is made of a thin flexible material, the PCB (250) may be generated with deformation such as bending due to shock applied to the terminal surface (253). When the deformation such as bending is repetitively and continuously generated on the PCB (250) due to repetitive and continuous outside shock, this may cause a direct reason of disconnecting or damaging the support member (220).

Thus, the disconnection or damage of support member (220) can be restricted by a design where the position of support member (220) on the circuit member (231) is moved to an inside from a corner part of the circuit member (231) and by moving from the terminal surface (253) to a far position. Meantime, a discrete distance from a side where the terminal surface (253) is not disposed among each side of the circuit member (231) to the support member (220), i.e., the fourth discrete distance (DL4) illustrated in FIG. 4 is elongated to allow the position of the support member (220) to be moved to an inside from the corner part of the circuit member (231) whereby the disconnection or damage of the support member (220) can be restricted. However, when the fourth discrete distance (DL4) is elongated, the support member (220) may be generally concentrated to an inside of the circuit member (231), and in this case, the spatial utilization of the second coil (230), the circuit member (231) and the PCB (250) disposed with circuits of complex structure may be reduced.

Because of this reason, the first discrete distance (DL1) may be shorter than the second discrete distance (DL2), and the third discrete distance (DL3) may be longer than the fourth discrete distance (DL4), as illustrated in FIG. 8. Furthermore, the support member (220), when viewed from the paper of FIG. 8, may be disposed on an upper area and a lower area among the four areas formed by the diagonal lines (DA).

The support member (220) in the exemplary embodiment may be disposed on the circuit member (231) in order to allow a discrete distance from a side where the terminal surface (253) is disposed among each side of the circuit member (231) to be longer than a discrete distance from a side where the terminal surface (253) is not disposed, whereby the support member (220) is prevented from being disconnected or damaged by the outside shock.

Meantime, due to difference between the first discrete distance (DL1) and second discrete distance (DL2), a sensitivity of x axis direction, i.e., a sensitivity of first direction movement of housing (140) and bobbin (110) detected by a driver (not shown) controlling the OIS operation and a sensitivity of y axis direction, i.e., a sensitivity of second direction, may become different. Thus, in order to compensate the sensitivity difference, there may be required a calibration of driver IC.

Figure 10:
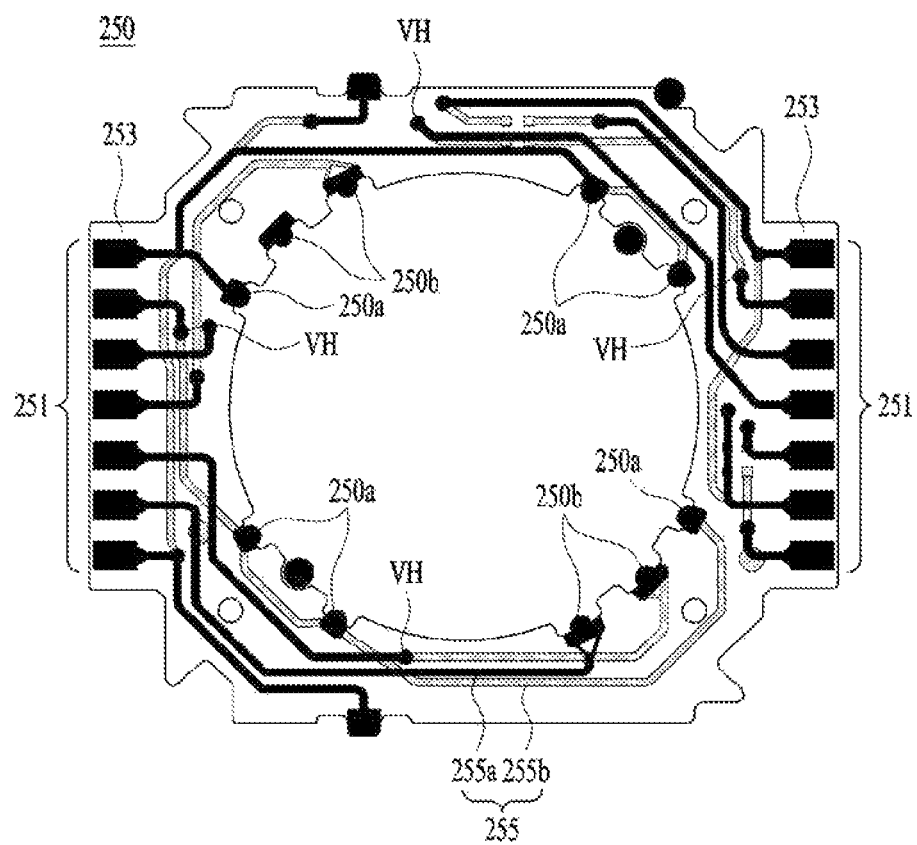
FIG. 10 is a planar view illustrating a PCB when viewed from an upper side according to a first exemplary embodiment of the present invention.

FIG. 10 is a planar view illustrating a PCB when viewed from an upper side according to a first exemplary embodiment of the present invention.

Referring to FIG. 10, the PCB (250) may be formed with a plurality of first terminals (250a) and a plurality of second terminals (250b). At this time, the first terminal (250a) may be electrically connected to the first coil (120) and the second terminal (250b) may be electrically connected to the second coil (230). For example, the first coil (120) may be electrically connected to the support member (220), the support member (220) may be electrically connected to the circuit member (231) and the circuit member (231) may be electrically connected to the PCB (250), whereby the first coil (120) and the first terminal (250a) formed on the PCB (250) may be mutually electrically connected.

At this time, for example, when one support member (220) is connected with a plurality of first terminals (250a), the circuit member (231) may be formed with a bifurcated lead wire configured to connect the one support member (220) and the plurality of first terminals (250a). Furthermore, for example, the circuit member (231) may be electrically connected to the PCB (250) whereby the second coil (230) formed on the PCB (250) and the second terminal (250b) formed on the PCB (250) can be mutually and electrically connected. The reason of forming the first terminal (250a) and the second terminal (250b) in a plural number is to prepare for damage to the PCB (250).

The first coil (120) and the second coil (230) may be electrically connected to an outside power source through the first terminal (250a) and the second terminal (250b) formed on the PCB (250) to receive a current from the outside power source. Meantime, the PCB (250) may be damaged by improper assembly, outside shock and the like. When the PCB (250) is damaged, the first terminal (250a) and the second terminal (250b) formed on the PCB (250) may be also damaged, or the first coil (120) and the second coil (230) may be electrically disconnected from outside power, and as a result, the auto focusing or OIS function of the lens driving device may be greatly decreased.

Particularly, when the PCB (250) is formed with a thin and flexible material, there is a high probability that the PCB (250) is damaged. Thus, it is necessary to prepare for damage to the PCB (250). In the exemplary embodiment, the PCB (250) may be formed with the first terminal (250a) and the second terminal (250b) in a plural number to prepare for short-circuit caused by damage to the PCB (250) between the first coil (120) and the first terminal (250a) or between the second coil (230) and the second terminal (250b). That is, by forming the first terminal (250a) and the second terminal (250b) in a plural number, even if a particular area of the PCB (250) is damaged to damage the terminals on the particular area, coils can be maintained with outside power through terminals formed on other areas.

Referring to FIG. 10, the plurality of first terminals (250a) may be mutually symmetrically formed based on a center of the PCB (250). Furthermore, the plurality of second terminals (250b) may be mutually symmetrically formed based on a center of the PCB (250). That is, it may be proper to dispose the first terminals (250a) and the second terminals (250b) near a hollow hole area of the PCB (250) in order to facilitate an easy electrical connection, and in this case, each terminal may be maximally spaced apart from the PCB (250) by allowing the first terminals (250a) and the second terminals (250b) to form a point symmetry about a center of PCB (250). Thus, even if a particular area of the PCB (250) is damaged, only the terminals disposed near to the damaged area may be damaged and other terminals disposed far from the damaged area can escape the damage by allowing each terminal to be maximally spaced apart from the PCB (250).

The first coil (120) and the second coil (230) may be such that one distal end of both distal ends may be a (+) terminal and the other may be a (−) terminal. Thus, the first terminals (250a) and the second terminals (250b) may be formed with a (+) terminal and a (−) terminal in order to correspond to the (+) terminal and the (−) terminal of the first coil (120) and the second coil (230).

At this time, it is appropriate for the (+) terminals and the (−) terminals to be formed in the same number. Thus, the plurality of first terminals (250a) and the second terminals (250b) may be formed with the same number of (+) terminals and (−) terminals. The first terminal (250a) may be connected to a relatively far-distanced first coil (120), and the second terminal (250b) may be connected to a relatively near-distanced first coil (120). Due to the positional difference, when the PCB (250) is damaged, the relatively far-distanced first terminal (250a) and the first coil (120) may have a higher probability of short-circuit than the relatively near-distanced second terminal (250b) and the second coil (230).

Thus, in order to effectively restrict short-circuits between coils and terminals caused by damage to the PCB (250), more number of first terminals (250a) may be disposed than that of second terminals (250b). However, the present invention is not limited thereto.

Meantime, because each of the first terminals (250a) and the second terminals (250b) is formed with the (+) terminal and the (−) terminals, the first terminals (250a) and the second terminals (250b) may be minimally formed with two (+) terminal and two (−) terminals.

In consideration of the foregoing statement, as illustrated in FIG. 10, the first terminal (250a) may be formed with a total of six terminals, and the second terminal (250b) may be formed with a total of four terminals, for example. However, the present invention is not limited thereto.

At this time, in light of the fact that the number of (+) terminals and (−) terminals are same in the terminals, the first terminal (250a) may be formed with a total of three (+) terminals and three (−) terminals, and the second terminal (250b) may be formed with a total of two (+) terminals and two (−) terminals. However, the present invention is not limited thereto.

The PCB (250) may include a lead wire pattern (255). The lead wire pattern (255) functions to connect the first terminal (250a) or the second terminal (250b) to a terminal (251) formed on the terminal surface (253). The lead wire pattern (255) may include a first lead wire pattern (255a) and a second lead wire pattern (255b) in order to increase the spatial utilization of PCB (250). The first lead wire pattern (255) may be formed at an upper surface of PCB (250), and the second lead wire pattern (255b) may be formed at a lower surface of PCB (250).

The formation of lead wire pattern (255) on both the upper surface and the lower surface of PCB (250) may increase the spatial utilization of PCB (250) and facilitate the formation of lead wire patterns (255) on the PCB (250) as well.

The terminal (251) in the exemplary embodiment that is connected to outside power source may be formed on an upper surface of PCB (250), and the second lead wire pattern (255b) may be formed on a lower surface of PCB (250). Thus, the PCB (250) may be formed with a via hole (VH) through which the second lead wire pattern (255b) and the terminal (251) may be mutually electrically connected.

Because a plurality of first terminals (250a) and second terminals (250b) are formed in the exemplary embodiment, the first coil (120) or the second coil (230) may be restricted from being disconnected with the outside power source due to damage to the PCB (250).

Figure 11:
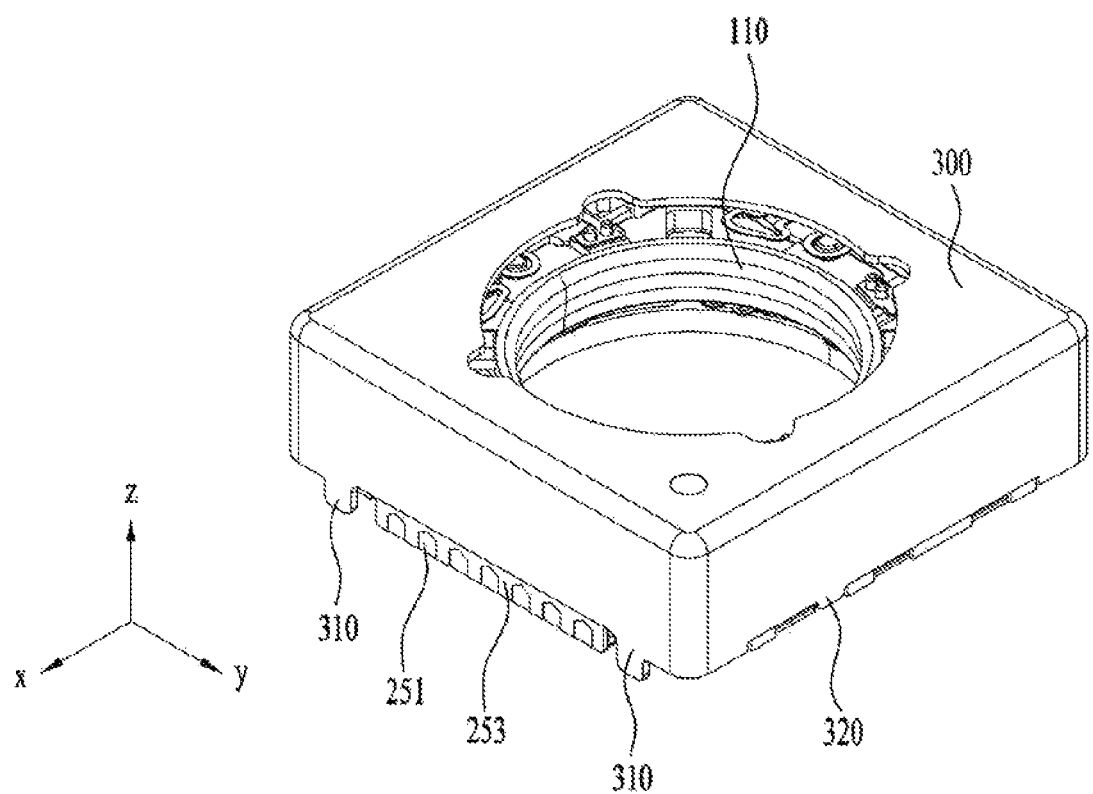
FIG. 11 is a schematic view of FIG. 1 rotated about z axis.
Figure 12:
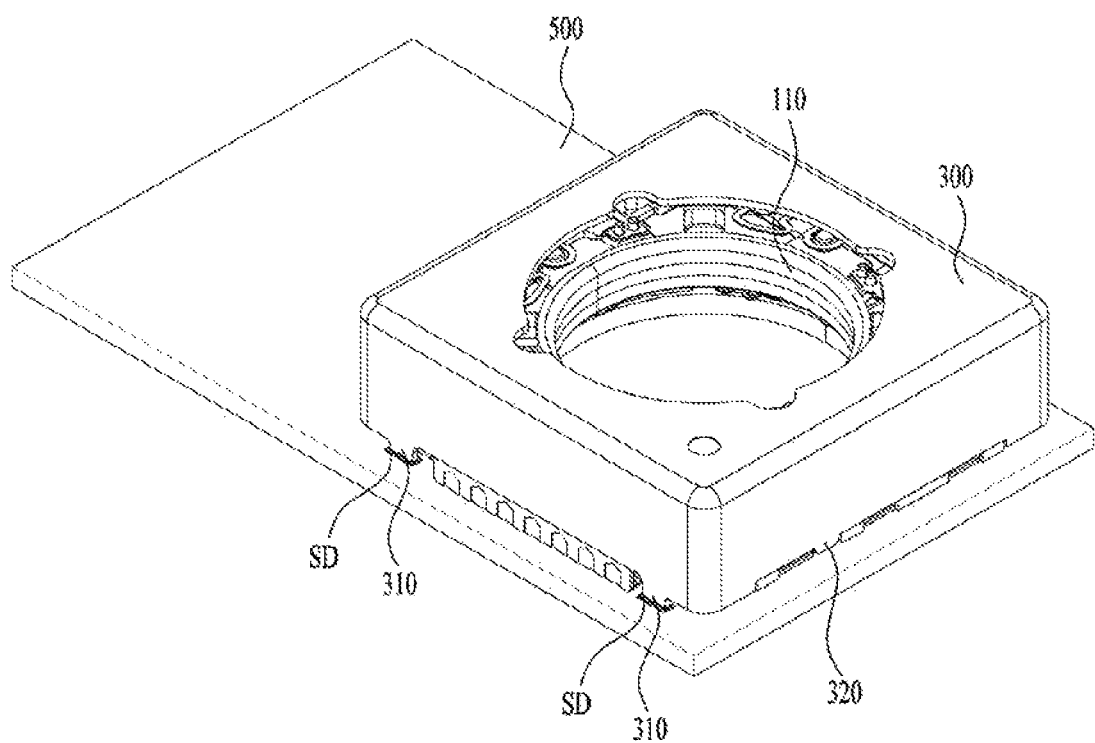
FIG. 12 is a schematic view illustrating a state where a lens driving apparatus and a holder member are coupled according to a first exemplary embodiment of the present invention.

FIG. 11 is a schematic view of FIG. 1 rotated about z axis, and FIG. 12 is a schematic view illustrating a state where a lens driving apparatus and a holder member are coupled according to a first exemplary embodiment of the present invention.

A holder member (500) may be formed at a lower surface of base (210), and may be disposed with various elements including a driver IC and gyro sensor for controlling operations of lens driving device. The lens driving device may be electrically connected to the holder member (500) by coupling the terminal (251) formed on the terminal surface (253) of PCB (250) to a terminal (not shown) formed on the holder member (500).

The cover member (300) may include a first protrusion (310). The first protrusion (310) may be disposed on both sides of terminal surface (253) and may be protrusively formed to a lower surface of cover member (300). The first protrusion (310) may be coupled to the holder member (500) to facilitate a soldering coupling and electric connection work between the terminal (252) of PCB (250) accommodated into the cover member (300) and a terminal of holder member (500).

That is, when the first protrusion (310) and the holder member (500) are coupled, the terminal (251) of PCB (250) accommodated into the cover member (300) may be disposed on a position opposite to the terminal of holder member (500) to thereby restrict the movement of PCB (250). Thus, because the movement of PCB (250) is restricted by the first protrusion (310), the soldering work between the terminal (251) and the terminal can be easily performed.

At this time, the first protrusion (310) and the holder member (500) may be coupled by a coupling agent (SD). The coupling agent (SD) may be an adhesive agent such as a solder, epoxy and the like. However, the present invention is not limited thereto.

The coupling work between the first protrusion (310) and the holder member (500) may be implemented by an active alignment process, for example, in order to allow the lens driving device to be adequately arranged to a designed position and a designed angle relative to the holder member (500).

The cover member (300) may include a second protrusion (320). The second protrusion (320) may be protrusively formed to a lower surface of the cover member (300) from a side where the terminal surface (253) is not formed in the PCB (250). The second protrusion (320) along with the first protrusion (310) may facilitate a soldering coupling and electric connection work between the terminal (252) of PCB (250) and the terminal of holder member (500).

That is, the second protrusion (320) may be coupled with the base (210) to restrict the movement of base (210). When the movement of base (210) is restricted, the movement of PCB (250) coupled to the base (210) may be also restricted. Hence, because the movement of PCB (250) is restricted by the second protrusion (320), the soldering work between the terminal (251) and the terminal can be easily performed.

In another exemplary embodiment, the second protrusion (320) may be coupled to the holder member (500) by soldering or adhesion using an adhesive agent. When the second protrusion (320) is coupled to the holder member (500), the terminal (251) of the PCB (250) accommodated into the cover member (300) may be disposed on a position opposite to that of the terminal of holder member (500), and the movement of PCB (250) is restricted to allow an easy soldering work between the terminal (251) and the terminal.

The first protrusion (310) and the second protrusion (320) in the exemplary embodiment may restrict the movement of PCB (250) to facilitate a soldering coupling and electric connection work between the terminal (251) of PCB (250) and the terminal of holder member (500).

Meantime, the lens driving device mentioned in the previous exemplary embodiments may be used in various fields, such as camera module and the like, for example. The camera module may be applicable to a mobile device such as a mobile phone, for example. The camera module in the exemplary embodiment may include a lens barrel, an image sensor (not shown). At this time, the lens barrel may include at least one sheet of lens transmitting an image to the image sensor. Furthermore, the camera module may further include an IR (Infrared) cut-off filter (not shown). The IR cut-off filter may serve to prevent a light of infrared ray region from entering an image sensor. In this case, the IR cut-off filter may be disposed on an area corresponding to that of image sensor at the base (210). In another exemplary embodiment, the IR cut-off filter may be coupled to the holder member (500).

The base (210) may be disposed with a separate terminal member in order to be electrically conductive with the PCB (250), and may be integrally formed with the terminal using a surface electrode. Furthermore, when the lens driving device includes a separate substrate, there may be no need of being disposed with a separate terminal.

Meantime, the base (210) may function as a sensor holder protecting the image sensor, and in this case, a protrusion may be formed along a side surface of the base (210) to a lower side direction, which however is not an essential element, and in another exemplary embodiment as shown in FIG. 12, the holder member (500) may be disposed on a lower side of base (210), and an image sensor may be mounted on the holder member (500), whereby the holder member (500) can perform a function of protecting the image sensor.

Figure 13:
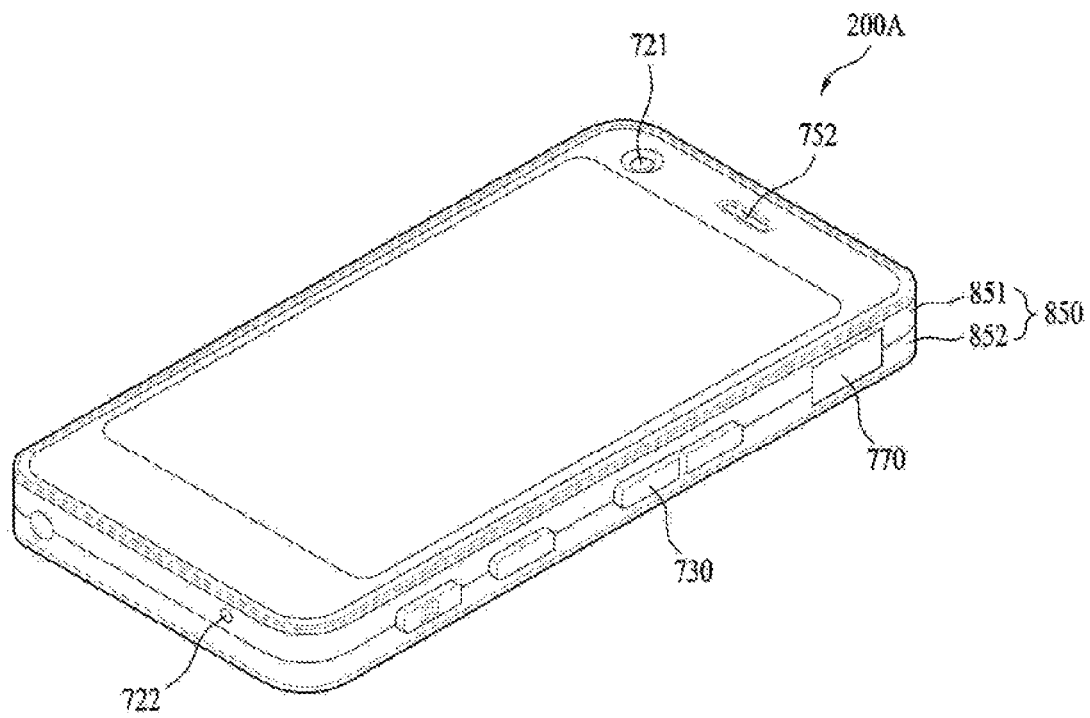
FIG. 13 is a perspective view illustrating an optical instrument according to a first exemplary embodiment of the present invention.
Figure 14:
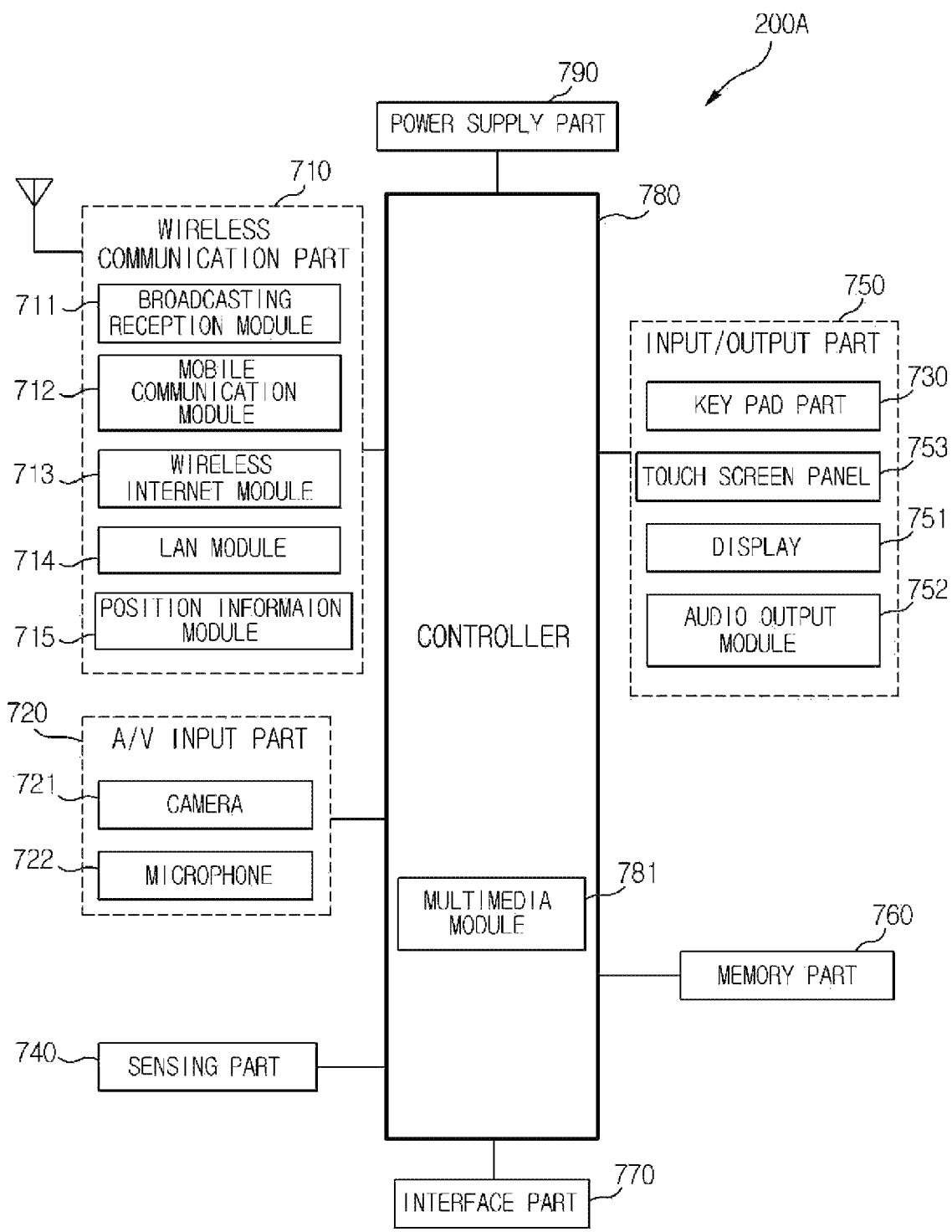
FIG. 14 is a schematic diagram illustrating an optical instrument illustrated in FIG. 13.

FIG. 13 is a perspective view illustrating an optical instrument according to a first exemplary embodiment of the present invention, and FIG. 14 is a schematic diagram illustrating an optical instrument illustrated in FIG. 13.

Referring to FIGS. 13 and 14, an optical instrument (200A) may include a body (850), a wireless communication part (710), an A/V (Audio/Video) input part (720), a sensing part (740), an input/output part (750), a memory part (760), an interface part (770), a controller (780) and a power supply part (790).

A space formed by a front case (851) and a rear case (852) of body (850) may be contained with various electronic elements of optical instrument. The wireless communication part (710) may be formed by including a broadcasting reception module (711), a mobile communication module (712), a wireless internet module (713), a LAN module (714) and a position information module (715), for example.

The A/V input part (720) is to input an audio signal or a video signal and may include a camera (721) and a microphone (722). The camera (721) may be a camera including the lens driving device (100). The sensing part (740) may generate a sensing signal for controlling the operation of optical instrument (200A) by detecting a current state of the optical instrument (200A) such as opening/closing state of optical instrument (200A), a position of optical instrument (200A), presence or absence of user contact, azimuth of optical instrument (200A) and acceleration/deceleration of optical instrument (200A). Furthermore, the sensing part (740) may take care of sensing functions related to power supply of power supply part (790) and coupling of outside devices to the interface part (770).

The input/output part (750) is to generate an input or an output related to visual, audio or tactile matters. The input/output part (750) may generate an input data for controlling an operation of the optical instrument (200A), and may also display information processed by the optical instrument (200A). The input/output part (750) may include a key pad part (730), a display module (751), an audio output module (752) and a touch screen panel (753). The key pad part (730) can generate an input data using a key pad input.

The display module (751) may include a plurality of pixels that changes in color according to an electric signal. The audio output module (752) may output audio data received from the wireless communication part (710) including a call signal reception, a communication mode, a recording mode, a voice recognition mode or a broadcasting reception mode, or output an audio data stored in the memory part (760). The touch screen panel (753) may convert changes in capacitance generated by a user touch relative to a particular region of touch screen.

The memory part (760) may store programs for processing and controlling the controller (780), input/output data and images photographed by the camera (721). The interface part (770) may receive data or power source from outside devices and transmit the same to each element inside of the optical instrument (200A), or allow data inside the optical instrument (200A) to the outside devices.

The controller (780) may control an overall operation of optical instrument (200A). The controller (780) may include a panel controller (144) of a touch screen panel driving part illustrated in FIG. 1, or perform a function of the panel controller (144). The controller (780) may be configured to include a multimedia module (781) for multimedia reproduction. The controller (780) may perform a pattern recognition processing capable of recognizing, as each character and image, a writing input or a graphic drawing input performed on a touch screen.

The power supply part (790) may supply an electric power necessary for operating each element by receiving an outside power source or an internal power source in response to control of the controller (780).

Hereinafter, a second exemplary embodiment of the present invention will be described.

Figure 15:
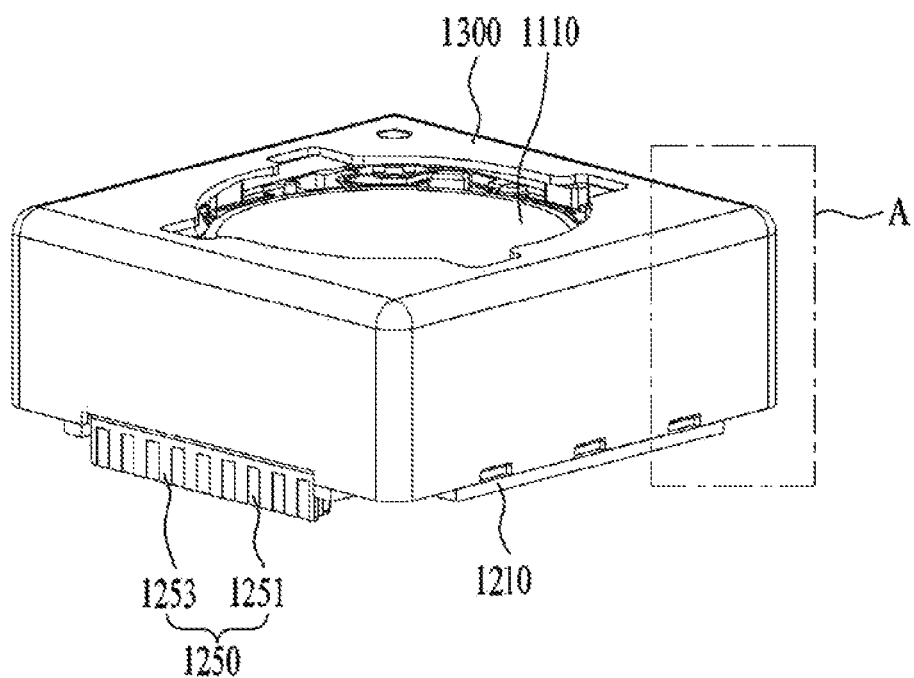
FIG. 15 is a perspective view illustrating a lens driving apparatus according to a second exemplary embodiment of the present invention.
Figure 16:
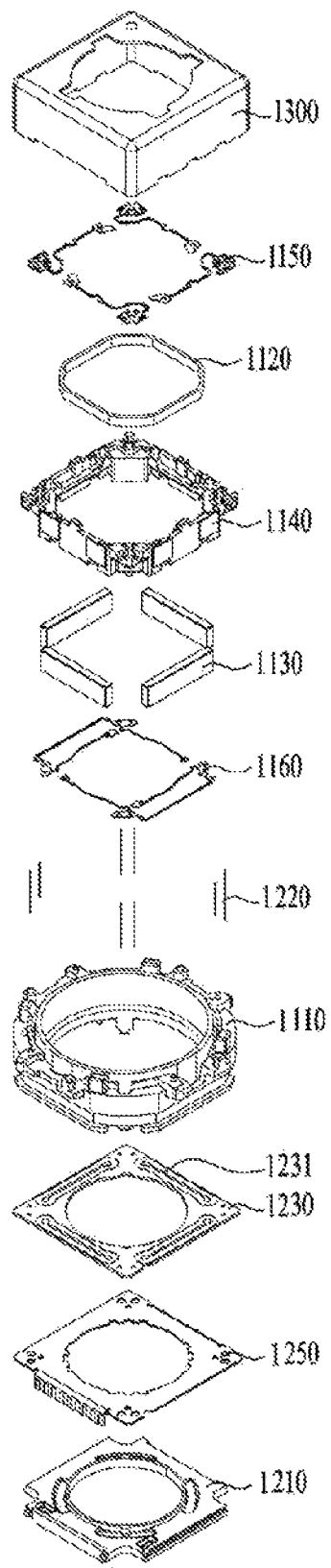
FIG. 16 is an exploded perspective view illustrating a lens driving apparatus according to a second exemplary embodiment of the present invention.

FIG. 15 is a perspective view illustrating a lens driving apparatus according to a second exemplary embodiment of the present invention, and FIG. 16 is an exploded perspective view illustrating a lens driving apparatus according to a second exemplary embodiment of the present invention.

An OIS device applied to a small camera module in a mobile device such as a smart phone or a tablet PC means a device configured to prevent a border of an image photographed amid vibrations caused by a user handshake when the image was photographed in a still motion from being formed unclearly. Furthermore, an auto focusing device means a device configured to automatically capture a focus of an image of a subject on an image sensor (not shown).

The thus-mentioned OIS device and the auto focus device may be variably configured, and in case of the present exemplary embodiment, the OIS operation or the auto focus operation may be implemented by moving an optical module formed with a plurality of lenses to a first direction or a direction perpendicular to the first direction.

Referring to FIG. 16, a lens driving device (1100) according to the second exemplary embodiment of the present invention may include a mover and a stator. At this time, the mover may perform an auto focusing function of a lens. The mover may include a bobbin (1110) and a first coil (1120), and the stator may include a first magnet (1130), a housing (1140), an upper support member (1150) and a lower elastic member (1160).

The bobbin (1110) may be disposed on an inside of the housing (1140), and may be at an outer circumferential surface with a first coil (1120) disposed on an inside of the first magnet (1130), where the bobbin (1110) can reciprocally move to a first direction in an inner space of the housing by an electromagnetic interaction between the first magnet (1130) and the first coil (1120). The outer circumferential surface of bobbin (1110) may be formed with a first coil (1120) to enable the electromagnetic interaction with the first magnet (1130).

Furthermore, the bobbin (1110) may be elastically supported by the upper elastic member (1150) and the lower elastic member (1160) to perform the auto focusing function by moving to the first direction. The bobbin (1110) may include therein a lens barrel (not shown) mounted with at least one lens. The lens barrel may be coupled to an inside of bobbin (1110) using various methods. For example, an inner circumferential surface of bobbin (1110) may be formed with a female screw thread and an outer circumferential surface of lens barrel may be formed with a male screw thread corresponding to the female screw thread, where the lens barrel can be coupled to the bobbin (1110) by screw-connection between the female screw thread and the male screw thread.

However, the present invention is not limited thereto, and the lens barrel may be directly fixed to an inside of the bobbin (1110) using other methods than the screw-connection method by not forming a screw thread on the inner circumferential surface of bobbin (1110). Alternatively, more than one sheet of lens may be integrally formed with the bobbin (1110) without using a lens barrel.

The lens coupled to the lens barrel may be formed with one sheet, and two sheets or more than two sheets of lenses may be configured to form an optical system. The auto focusing function may be controlled by the direction of current and/or an amount of current, and may be implemented by moving the bobbin (1110) to the first direction. For example, when a forward current is applied, the bobbin (1110) may be moved downwardly from an initial position. Alternatively, a movement distance to one direction from the initial position can be increased or decreased by adjusting an amount of current of one direction.

An upper surface and a lower surface of bobbin (1110) may be protrusively formed with a plurality of upper support lugs and lower support lugs. The upper support lug may be formed in a cylindrical shape, or a prism shape to guide the upper elastic member (1150) whereby the upper support lug may be coupled and fixed to the upper elastic member (1150). The lower support lug may be also formed in a cylindrical shape, or a prism shape to guide the lower elastic member (1160) whereby the lower support lug may be coupled and fixed to the lower elastic member (1160).

At this time, the upper elastic member (1150) may be formed with a through hole and/or a groove corresponding to the upper support lug, and the lower elastic member (1160) may be formed with a through hole and/or a groove corresponding to the lower support lug. The each support lug and through hole and/or groove may be fixedly coupled using a thermal fusion or an adhesive member such as epoxy.

The housing (1140) may take a hollow hole pillar shape supporting the first magnet (1130) and may be substantially formed with a square shape. A side surface of housing (1140) may be formed by allowing the first magnet (1130) to be coupled thereto. Furthermore, as discussed above, the housing (1140) may be formed at an inside with a bobbin (1110) guided by the elastic members (1150, 1160) to move to the first direction.

The upper elastic member (1150) may be disposed on an upper side of bobbin (1110), and the lower elastic member (1160) may be 3 disposed on a lower side of bobbin (1110). The upper elastic member (1150) and the lower elastic member (1160) may be coupled to the housing (1140) and the bobbin (1110), and the upper elastic member (1150) and the lower elastic member (1160) may elastically support the up/down operation of bobbin (1110) to the first direction. The upper elastic member (1150) and the lower elastic member (1160) may be formed with a leaf spring.

The upper elastic member (1150) may be formed in a plural number, as illustrated in FIG. 16. Through this multi-divided structure, each divided portion of upper elastic member (1150) may receive a mutually different polarity of current or power source, or may be a current transfer path. Alternatively, the lower elastic member (1160) may be also formed with a multi-divided structure to be electrically connected to the upper elastic member (1150).

Meantime, the upper elastic member (1150) and the lower elastic member (1160), the bobbin (1110) and the housing (1140) may be assembled through a bonding operation using thermal fusion and/or adhesive agent.

The base (1210) may be disposed on a lower surface of bobbin (1110), may be generally provided in a square shape and may be arranged or accommodated with a PCB (1250). A surface opposite to an area formed with a terminal surface (1253) of the PCB (1250) may be formed with a support groove with a size corresponding to that of the surface. The support groove may be concavely formed inwardly at a predetermined depth from an outer circumferential surface of base (1210) to prevent an area formed with the terminal surface (1253) from protruding to outside or may adjust an amount of being protruded.

A support member (1220) may be arranged at a side surface of the housing (1140) to be spaced apart from the housing (1140), coupled at an upper side to the upper elastic member (1150), and coupled at a lower side to the base (1210), the PCB (1250) or to the circuit member (1231) to allow the bobbin (1110) and the housing (1140) to movably support to a second direction perpendicular to the first direction and/or to a third direction, and may be electrically connected to the first coil (1120).

The support member (1220) in the exemplary embodiment is disposed on an outer circumferential surface of a corner of housing (1140) with a pair, so that a total of eight (8) support members (1220) may be installed. In another exemplary embodiment, one support member (1220) may be installed at an outer circumferential surface of corner at the housing (1140), so that a total of four (4) support members (1220) may be installed. In still another exemplary embodiment, two each at two corners, one each at two corners may be disposed so that a total of six (6) support members (1220) may be installed. Furthermore, depending on the case, a total of seven (7) or a total of more than nine (9) support members (1220) may be installed.

Furthermore, the support member (1220) may be electrically connected to the upper elastic member (1150). That is, for example, the upper elastic member (1150) may be electrically connected to an area formed with a through hole of the upper elastic member (1150). Furthermore, in light of the fact that the support member (1220) is separately formed from the upper elastic member (1150), the support member (1220) and the upper elastic member (1150) may be electrically connected through soldering or welding method. Thus, the upper elastic member (1150) can apply a current to the first coil (1120) through the electrically-connected support member (1220).

The support member (1220) may be connected to the PCB (1250) through a through hole formed at the circuit member (1231) and/or the PCB (1250). Alternatively, the support member (1220) may be electrically soldered to an area corresponding to the circuit member (1231) by not allowing a through hole to be formed on the circuit member (1231) and/or the PCB (1250).

Meantime, although FIG. 16 has illustrated a linear support member (1220) as an exemplary embodiment, the present invention is not limited thereto. That is, the support member (1220) may be formed in a shape of a plate type member.

A second coil (1230) may perform the OIS function by moving the housing to the second and/or third direction through an electromagnetic interaction with the first magnet (1130). Here, the second and third direction may include not only x axis (or first direction), y axis (or second direction), but also a direction substantially near to the x and y axis direction. That is, with respect to the driving aspect in the exemplary embodiment, although the housing (1140) may move in parallel to the x axis and y axis direction, the housing (1140) may a bit slantly move to the x and y axis direction while moving by being supported by the support member (1220). Thus, there is a need of the first magnet (1130) being installed at a position corresponding to the second coil (1230).

The second coil (1230) may be so disposed as to face the first magnet (1130) fixed to the housing (1140). In one exemplary embodiment, the second coil (1230) may be disposed on an outside of the first magnet (1130). Alternatively, the second coil (1230) may be disposed on a lower side of the first magnet (1130) by being spaced apart at a predetermined distance.

The second coil (1230) according to the exemplary embodiment may be installed at four sides of circuit member (1231), a total of four (4) pieces. However, the present invention is not limited thereto, and therefore, only two second coil (1230), one for second direction and one for third direction, may be installed, and even four (4) pieces may be installed.

Alternatively, a total of six (6) pieces of second coil (1230) may be installed, one on a first side for second direction, two pieces on a second side for second direction, one piece at a third side for third direction and two pieces at fourth side for third direction. Alternatively, in this case, the first side and the fourth side are mutually adjacent, and the second side and the third side may be mutually and adjacently located.

In the exemplary embodiment, the circuit member (1231) may be formed with a circuit pattern in the shape of the second coil (1230), or may be formed at an upper surface with a separate second coil, but the present invention is not limited thereto, and the circuit member (1231) may be directly formed at an upper surface with a circuit pattern in the shape of the second coil (1230). Alternatively, the second coil (1230) may be configured by winding a wire in the shape of a doughnut, or the second coil (1230) may be formed in the shape of an FP coil to allow being electrically connected to the PCB (1250).

The circuit member (1231) including the second coil (1230) may be installed or disposed on an upper surface of the PCB (1250) disposed on an upper surface of base (1210). However, the present invention is not limited thereto, and the second coil (1230) may be tightly arranged with the base (1210), may be arranged by being spaced apart at a predetermined distance, or may be separately formed on a substrate, where the substrate is stacked and connected onto the PCB (1250).

The PCB (1250) may be electrically connected to at least one of the upper elastic member (1150) and the lower elastic member (1160), may be coupled to an upper surface of base (1210), and as illustrated in FIG. 16, a through hole inserted by the support member (1220) may be formed at an area corresponding to a distal end of the support member (1220). Alternatively, instead of forming a through hole, the PCB (1250) may be electrically connected and/or bonded to the support member.

The PCB (1250) may be arranged or formed with a terminal (1251), where the terminal (1251) may be arranged at the bent terminal surface (1253). The terminal surface (1253) may be arranged with a plurality of terminals (1251) to receive an outside electric power whereby a current may be supplied to the first coil (1120) and/or to the second coil (1230). The number of terminals arranged on the terminal surface (1253) may be increased or decreased depending on the types of elements necessary for control. Furthermore, the PCB (1250) may be formed with one or two terminal surfaces (1253).

The cover member (1300) may be generally provided with a box shape, may accommodate the mover, the second coil (1230) and a portion or all of the PCB (1250), and may be coupled with the base (1210). Furthermore, a portion of cover member (1300) may be arranged at an upper side of support member (1220).

The cover member (1300) may protect the mover accommodated therein, the second coil (1230) and the PCB (1250) from being damaged, and may additionally concentrate the electromagnetic field by restricting the electromagnetic field generated from the first magnet (1130) accommodated therein, the first coil (1120) and the second coil (1230) from being leaked out.

Figure 17:
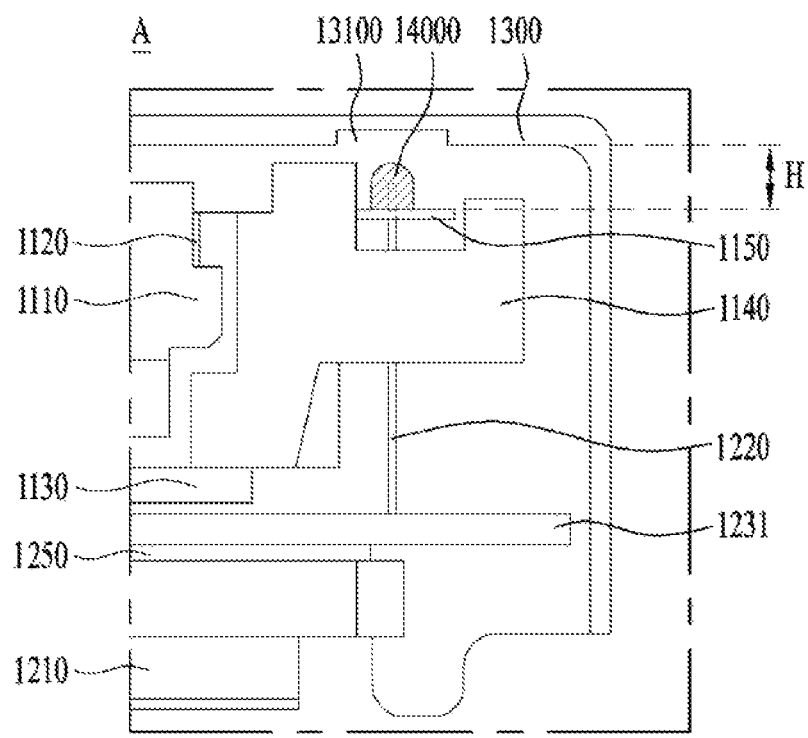
FIG. 17 is a cross-sectional view of 'A' area in FIG. 15 according to an exemplary embodiment of the present invention.

FIG. 17 is a cross-sectional view of 'A' area in FIG. 15 according to an exemplary embodiment of the present invention.

Referring to FIG. 17, the cover member (1300) may be formed with an escape groove (13100). The escape groove (13100) may be concavely formed at a portion of the cover member (1300), i.e., at an area corresponding to the support member (1220) to the first direction, by allowing the cover member (1300) to be recessed to the first direction. The escape groove (13100) may prevent the electric short-circuit generated by contact between the support member (1220) and the cover member (1300). An upper surface of support member (1220) may be electrically connected to the upper elastic member (1150). In order to secure the electric connection, the lens driving device according to the exemplary embodiment may further comprise a soldering part (14000) coupling the upper surface of support member (1220) and the upper elastic member (1150).

An upper end of the soldering part (14000) where a lower surface of cover member (1300) is close to a discrete distance to the first direction may directly contact the cover member (1300) to allow the support member (1220) and the cover member (1300) to be electrically connected, thereby resulting in generation of electric short-circuit. The electric short-circuit may cause an operational problems in auto focusing and/or OIS function of lens driving device. For example, the bobbin (1110) that receives a current through the support member (1220) may be generated with an unwanted vibration because of short-circuit. Furthermore, a mechanical hysteresis may increase on the support member (1220), the bobbin (1110), the upper elastic member and the lower elastic member due to short-circuit and the vibration of bobbin (1110).

As a result, the increased hysteresis can greatly decrease the auto focusing and/or OIS function of the lens driving device, whereby the focus adjustment and OIS adjustment functions of camera module including the lens driving device may be greatly degraded to subsequently decrease the quality of photographed image.

In the exemplary embodiment, the escape groove (13100) is formed to prevent the electric short-circuit between the cover member (1300) and the support member (1220) whereby the abovementioned problems can be solved. In the exemplary embodiment, it would be appropriate that depth of the escape groove (13100) be determined in consideration of overall size and structure of lens driving device. An upper end of the soldering part (14000) may be disposed on a more upper side than the upper elastic member (1150). Furthermore, for example, a first direction discrete distance (H) between an upper surface of the upper elastic member (1150) and the lower surface of cover member (1300) may be about 0.5 mm. However, the present invention is not limited thereto.

Meantime, in light of the trend that the discrete distance (H) is being reduced as the manufacturing of super small camera module and the lens driving device is on the increase, there may be a high probability of the upper end of soldering part (14000) and the lower surface of cover member (1300) being in contact. Thus, in consideration of the foregoing trend, it may be required that the discrete distance (H) is designed to be great, if possible, and depth of escape groove (13100) is determined lest the upper end of soldering part (14000) and the lower surface of cover member (1300) contact each other. Furthermore, it is also appropriate that the depth of escape groove (13100) be determined in consideration of thickness of an area corresponding to the support member (1220) of the cover member (1300).

The escape groove (13100) may be formed by various methods. In the exemplary embodiment, the escape groove (13100) may be formed by a method of etching the cover member (1300). In another exemplary embodiment, the escape groove (13100) may be simultaneously formed when the cover member (1300) is manufactured through injection molding process. In still another exemplary embodiment, the escape groove (13100) may be formed by pressing a portion of the cover member (1300).

For example, the cover member (1300) may be formed with SUS of no magnetism or nickel silver material. The cover member (1300) may be formed with a thickness of 0.2 mm~0.3 mm in order to protect inner parts from outside shocks. At this time, it is appropriate that depth of escape groove (13100) be more than 0.05 mm. However, this numerical value is merely an example, and the depth of escape groove and the thickness of cover member (1300) may be differently formed as mentioned above.

In the exemplary embodiment, the escape groove (13100) formed on the cover member (1300) may prevent the electric short-circuit between the support member (1220) and the cover member (1300) to thereby prevent the operational problem of lens driving device caused by short-circuit and degraded quality of the photographed image.

Figure 18:
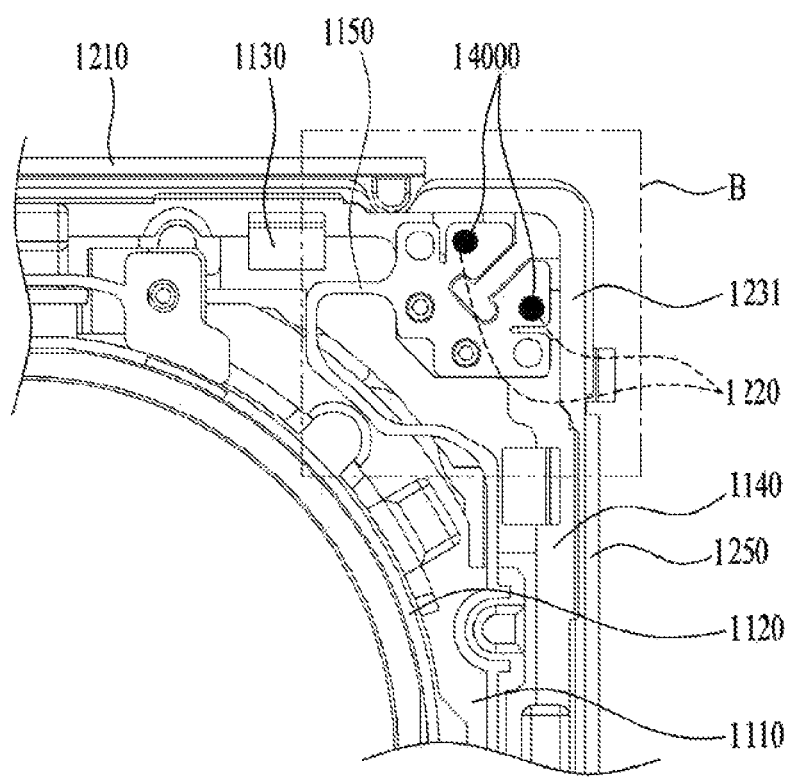
FIG. 18 is a plane view removed of cover member in the lens driving apparatus according to a second exemplary embodiment of the present invention.
Figure 19:
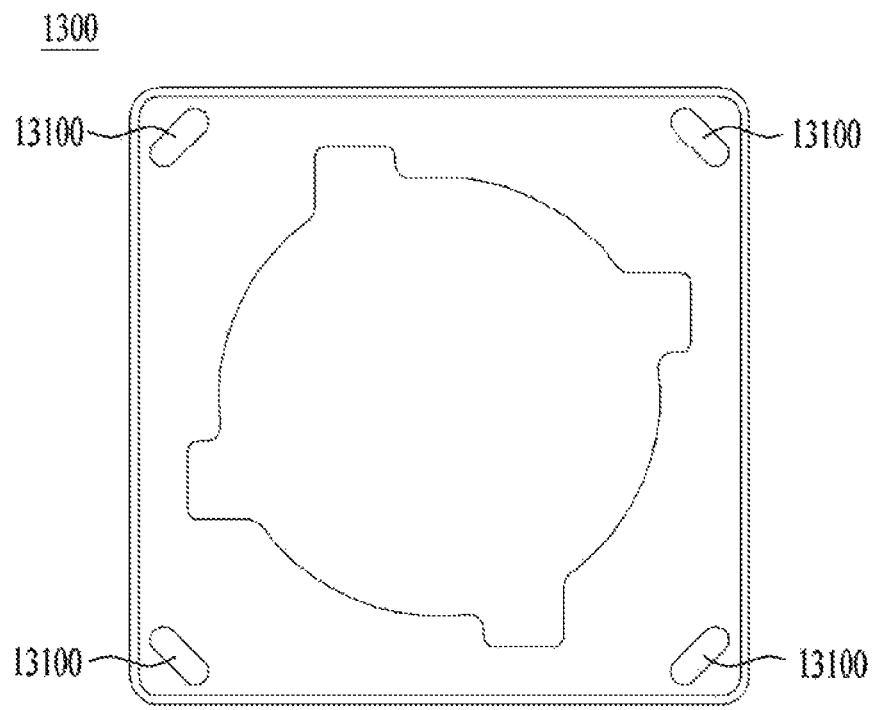
FIG. 19 is a bottom view illustrating a cover member according to a second exemplary embodiment of the present invention.

FIG. 18 is a plane view removed of cover member in the lens driving apparatus according to a second exemplary embodiment of the present invention, and FIG. 19 is a bottom view illustrating a cover member according to a second exemplary embodiment of the present invention.

Referring to FIG. 18, the support member (1220) may be formed in a shape of a wire, and may be disposed in a plural number on a corner area of the housing (1140). That is, a pair of wire-shaped support members is respectively arranged on a corner area of housing (1140) in the lens driving device according to an exemplary embodiment, and therefore, a total of eight (8) support members (1220) may be arranged.

The support member (1220) may be coupled to the upper elastic member (1150) for electrical connection through the soldering part (14000). Thus, the escape groove (13100) may be formed on an area of the cover member (1300) corresponding to an area arranged with the support member (1220) and the soldering part (14000) to the first direction. That is, the escape groove (13100) may be formed in a plural number on the cover member (1300) at a position corresponding to the support member (1220) to the first direction. Thus, as illustrated in FIG. 19, the escape groove (13100) may be respectively formed on a corner area of the support member (1220) in a total of four (4) pieces. Meantime, although FIG. 19 has illustrated the escape groove (1310) in a curved shape, the present invention is not limited thereto, and the escape groove (1310) may be formed in various shapes including a round shape, a semi-circle shape and a polygonal shape as long as a short-circuit between the cover member (1300) and the support member (1220) can be prevented.

Figure 20:
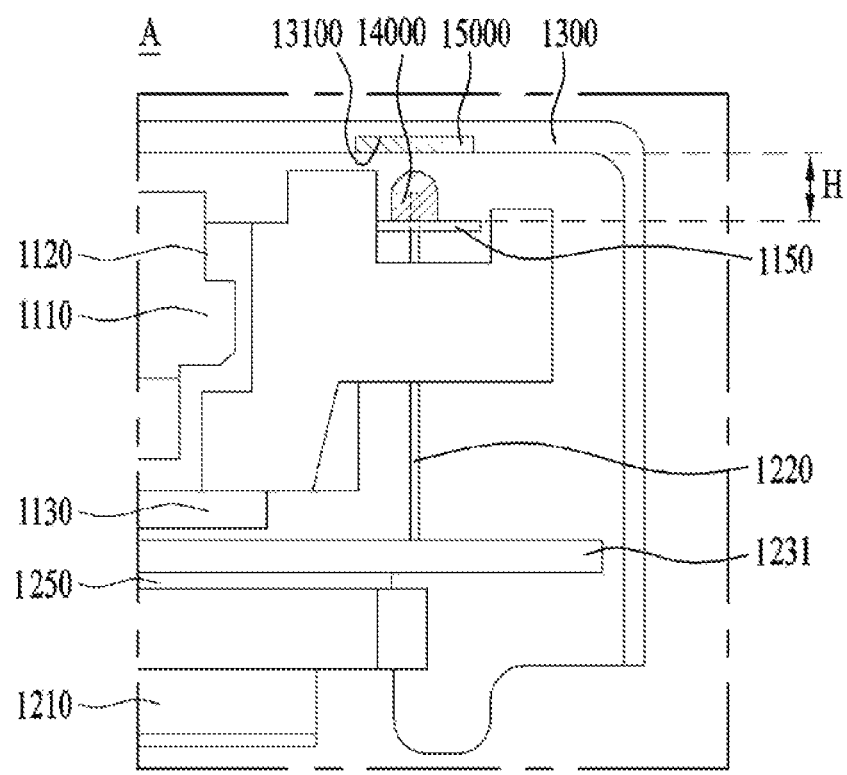
FIG. 20 is a cross-sectional view illustrating 'A' area of FIG. 15 according to another exemplary embodiment of the present invention.

FIG. 20 is a cross-sectional view illustrating 'A' area of FIG. 15 according to another exemplary embodiment of the present invention.

Referring to FIG. 20, the lens driving device according to another exemplary embodiment of the present invention may further comprise an insulation part (15000). The insulation part (15000) may be filled in the escape groove (13100) and may be formed with an electrically insulating material. The insulation part (15000) may be filled in the escape groove (13100) to electrically insulate the support member (1220) and the cover member (1300) and to prevent the generation of short-circuit between the support member (1220) and the cover member (1300) even if the upper surface of soldering part (14000) and the lower surface of the insulation part (15000) are brought into contact. At this time, the insulation part (15000) may be formed with a polymer material such as polyethylene and polyvinyl chloride and electrically insulating epoxy adhesive agent.

Meantime, in another exemplary embodiment, albeit not being illustrated, an area contacted by an upper surface of soldering part (14000) in the lower surface of the cover member (1300) may be formed only with the insulation part (15000) while not forming the escape groove (13100), so that even if the upper surface of soldering part (14000) contacts the lower surface of insulation part (15000), the short-circuit between the cover member (1300) and the support member (1220) can be prevented by electrically insulating the support member (1220) and the cover member (1300).

Figure 21:
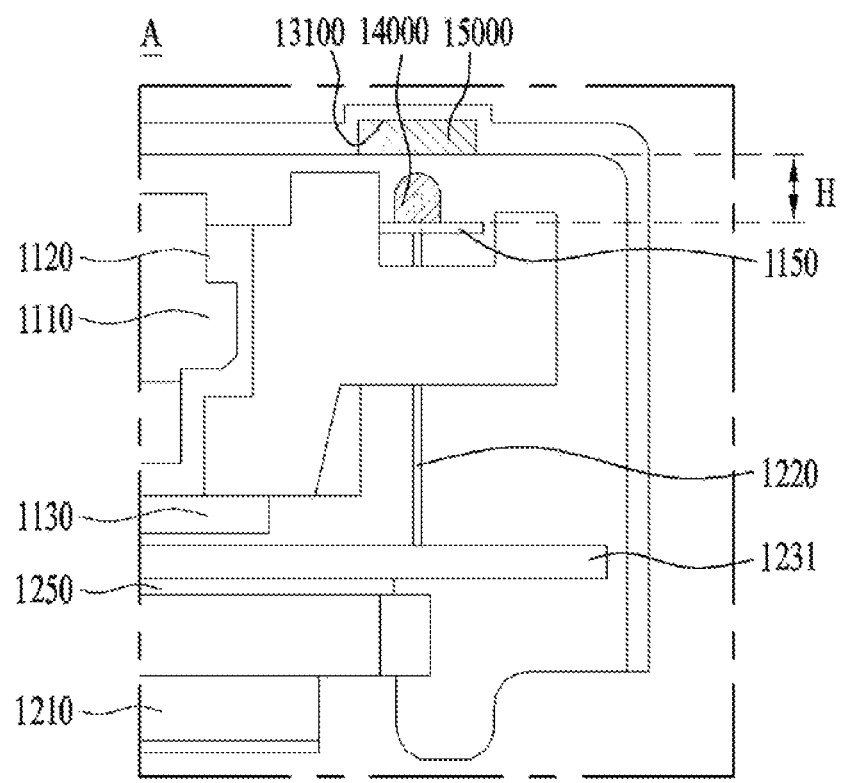
FIG. 21 is a cross-sectional view illustrating 'A' area of FIG. 15 according to still another exemplary embodiment of the present invention.

FIG. 21 is a cross-sectional view illustrating 'A' area of FIG. 15 according to still another exemplary embodiment of the present invention.

Referring to FIG. 21, the escape groove (13100) may be formed by one surface, that is, a lower surface of the cover member (1300) being recessed while the other surface, that is, the upper surface of the cover member (1300) is protruded, and through this structure, the depth of escape groove (13100) can be further enlarged to more effectively prevent the electrical short-circuit between the cover member (1300) and the support member (1220). The escape groove (13100) may be formed by injection molding or rolling, for example. Furthermore, as illustrated in FIG. 21, the escape groove (13100) may be filled with the insulation part (15000) to more effectively prevent short-circuit.

Figure 22:
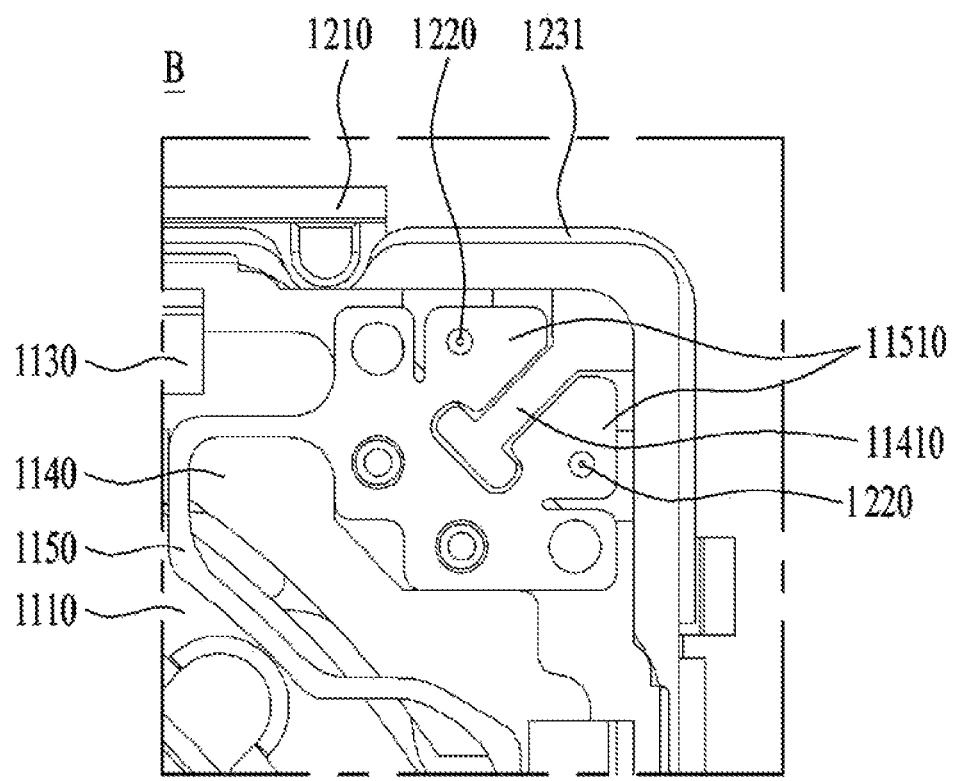
FIG. 22 is an enlarged view illustrating 'B' area of FIG. 18.
Figure 23:
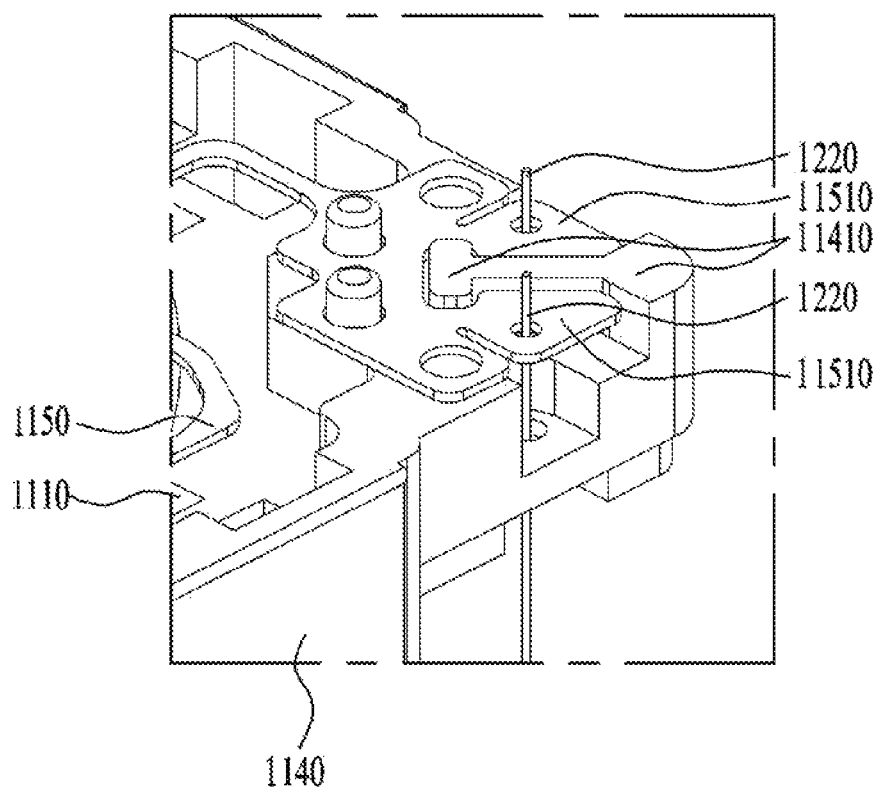
FIG. 23 is a perspective view of FIG. 22.

FIG. 22 is an enlarged view illustrating 'B' area of FIG. 18, and FIG. 23 is a perspective view of FIG. 22. The illustration of soldering part (14000) is omitted from FIGS. 22 and 23 in order to provide a clear explanation. As illustrated in FIGS. 22 and 23, the lens driving device according to the exemplary embodiment may include a protrusion (11410).

The upper elastic member (1150) may include a soldering coupling part (11510) coupled to an upper surface of the housing (1140) and soldered to an upper surface of support member (1220). Furthermore, the housing (1140) may be formed at an upper surface with a protrusion (11410) protrusively formed at a position near to the soldering coupling part (11510).

Furthermore, as illustrated in FIGS. 22 and 23, the soldering coupling part (11510) may be formed in a pair each pair spaced apart from the other, and the protrusion (11410) may be interposed between the pair of soldering coupling part (11510). The protrusion (11410) may prevent plastic deformation of soldering coupling part (11510). The soldering coupling part (11510) may be generated with the plastic deformation when an outside power is applied in the course of the upper elastic member (1150) being coupled to an upper surface of housing (1140) and electrically connected to the support member (1220). The soldering coupling part (11510) is structurally weak to plastic deformation because of being arranged at a corner area of upper elastic member (1150), and the soldering coupling part (11510) may be performed with many manual works of a worker including the soldering. Due to the abovementioned reasons, the soldering coupling part (11510) may be generated with plastic deformation in the course of assembly of upper elastic member (1150). When the plastic deformation is generated on the soldering coupling part (11510), the upper elastic member (1150) may have a shape different from design and the deformed upper elastic member (1150) may have a bad influence such as an erroneous operation or an inoperative performance.

Thus, the housing (1140) may be formed with the protrusion (11410) in order to prevent the plastic deformation of soldering coupling part (11510) in the course of assembling the upper elastic member (1150).

As illustrated in FIG. 23, the protrusion (11410) may be protruded to the first direction. When a worker or an operator couples the upper elastic member (1150) to the housing (1140) and solders/couples the soldering coupling part (11510) to the support member (1220), the worker may be restricted in a hand-using manual behavior of the soldering coupling part (11510) because of the protrusion (11410). There is a high possibility of the soldering coupling part (11510) being plastically deformed due to the hand-using behavior of soldering coupling part (11510), where the protrusion (11410) prevents the plastic deformation of soldering coupling part (11510) by restricting a worker's hand to reach or touch the soldering coupling part (11510) due to structure.

In the exemplary embodiment, the plastic deformation of soldering coupling part (11510) that may be generated when the upper elastic member (1150) is coupled to the housing (1140) can be prevented by forming the protrusion (11410) on the housing (1140). Meantime, the lens driving device according to the abovementioned exemplary embodiment may be used in various fields including camera module, for example. The camera module, for example, may be applied to mobile devices such as mobile phones and the like.

The camera module according to the exemplary embodiment may include a lens barrel coupled to a bobbin (1110) and an image sensor (not shown). At this time, the lens barrel may include at least one sheet of lens transmitting an image to the image sensor. Furthermore, the camera module may further include an IR cut-off filter. The IR cut-off filter may function to cut off a light of IR region being incident on the image sensor. In this case, an IR cut-off filter may be installed at a position corresponding to the image sensor in the base (1210) exemplified in FIG. 16, and may be coupled to a holder member (not shown). Furthermore, the holder member may support a lower side of base (1210). The base (1210) may be installed with a separate terminal member for electric conduction with the PCB (1250), and may integrally form a terminal using a surface electrode. Furthermore, when the lens driving device includes a separate substrate, a separate terminal may be dispensed with.

Meantime, the base (1210) can perform a sensor holder function protecting an image sensor, and in this case, a protruding area may be formed to a downward direction along a side surface of base (1210). However, the protruding area is not an essential element, and albeit not being illustrated, a separate sensor holder may be disposed on a lower surface of base (1210) to perform the role of the protruding area.

Hereinafter, an optical apparatus according to a third exemplary embodiment of the present invention will be described.

The optical apparatus may be a hand phone, a mobile phone, a smart phone, a portable smart device, a digital camera, a notebook computer (laptop computer), a PMP (Portable Multimedia Player) and a navigation device. However, the present invention is not limited thereto, and may include any device capable of photographing an image or a photograph.

The optical apparatus may include a main body (not shown), a camera module and a display part (not shown). However, any one or more of the main body, the camera module and the display part may be omitted or changed.

The main body may form an exterior look of an optical apparatus. For example, the main body may include a look of a cubic shape. For another example, the main body may be formed in a round shape on at least some portions thereof. The main body may accommodate a camera module. The main body may be arranged at one surface with a display part. For example, the display part and the camera module may be disposed on one surface of the main body and a camera module may be additionally disposed on the other surface (surface opposite to the one surface) of main body.

The camera module may be disposed on the main body. The camera module may be disposed on one surface of the main body. At least some portions of the camera module may be accommodated into the main body. The camera module may be formed in a plural number. The plurality of camera modules may be respectively disposed on one surface of the main body and the other surface of the main body. The camera module may photograph an image of a subject.

The display part may be disposed on the main body. The display part may be disposed on one surface of main body. That is, the display part may be arranged on a same surface as that of the camera module. Alternatively, the display part may be disposed on the other surface of main body. The display part may be disposed on a surface on the main body opposite to a surface arranged with the camera module. The display part may output an image photographed by the camera module.

Now, configuration of camera module according to a third exemplary embodiment of the present invention will be described.

The camera module may include a lens driving device (not shown), a lens module (not shown), an IR (Infrared) cut-off filter (not shown), a PCB (2800), an image sensor (not shown), and a controller (not shown).

The lens module may include a lens and a lens barrel. The lens module may include one or more lenses (not shown) and a lens barrel accommodating one or more lenses. However, one element of the lens module is not limited by the lens barrel, and any holder structure capable of supporting one or more lenses will suffice. The lens module may move along with the lens driving device by being coupled to the lens driving device. The lens module may be coupled to an inside of the lens driving device, for example. The lens module may be screw-coupled with the lens driving device, for example. The lens module may be coupled to the lens driving device using an adhesive (not shown), for example. Meantime, a light having passed the lens module may be irradiated on an image sensor.

The IR cut-off filter may serve to prevent a light of infrared ray region from entering an image sensor. The IR cut-off filter may be interposed between a lens module and an image sensor, for example. The IR cut-off filter may be disposed on a holder member (not shown) separately formed independent from a base (2500). However, the IR cut-off filter may be installed at a hollow hole (2510) formed at a center of the base (2500). The IR cut-off filter may be formed with a film material or a glass material. The IR cut-off filter may be formed by allowing an IR cut-off coating material to be coated on a plate-shaped optical filter such as an imaging plane protection cover glass or a cover glass, for example.

The PCB (2800) may support the lens driving device. The PCB (2800) may be mounted with an image sensor. For example, the PCB (2800) may be disposed on an upper inner side with an image sensor and may be disposed on an upper outer side with a sensor holder (not shown). An upper side of sensor holder may be disposed with the lens driving device. Alternatively, the PCB (2800) may be disposed on an upper outer side with the lens driving device and may be disposed on an upper inner side with an image senor.

Through this configuration, a light having passed the lens module coupled accommodated at an inside of the lens driving device may be irradiated on the image sensor mounted on the PCB. The PCB may supply an electric power to the lens driving device. Meantime, the PCB may be disposed with a controller for controlling the lens driving device.

The image sensor may be mounted on the PCB (2800). The image sensor may be so disposed as to match the lens module in terms of optical axis, through which the image sensor can obtain a light having passed the lens module. The image sensor may output the irradiated light in an image. The image sensor may be any one of a CCD (charge coupled device), an MOS (metal oxide semi-conductor), a CPD and a CID, for example. However, the types of image sensor are not limited thereto.

The controller may be mounted on a PCB (2800). The controller may be disposed on an outside of the lens driving device. However, the controller may be also disposed on an inside of the lens driving device. The controller may individually control a direction, intensity and an amplitude of a current supplied to each element forming the lens driving device. The controller may perform any one of an AF function and an OIS function of the camera module by controlling the lens driving device. That is, the controller may move the lens module to an optical axis direction or tilt the lens module to a direction orthogonal to the optical axis direction by controlling the lens driving device. Furthermore, the controller may perform any one or more feedback controls in the AF function and OIS function. To be more specific, the controller may perform a more accurate auto focusing and OIS functions by receiving a position of bobbin (2210) or housing (2310) detected by a sensor part and by controlling a power or a current applied to the AF driving coil part (2220).

Hereinafter, configuration of lens driving device according to the third exemplary embodiment of the present invention will be described with reference to the accompanying drawings.

Figure 24:
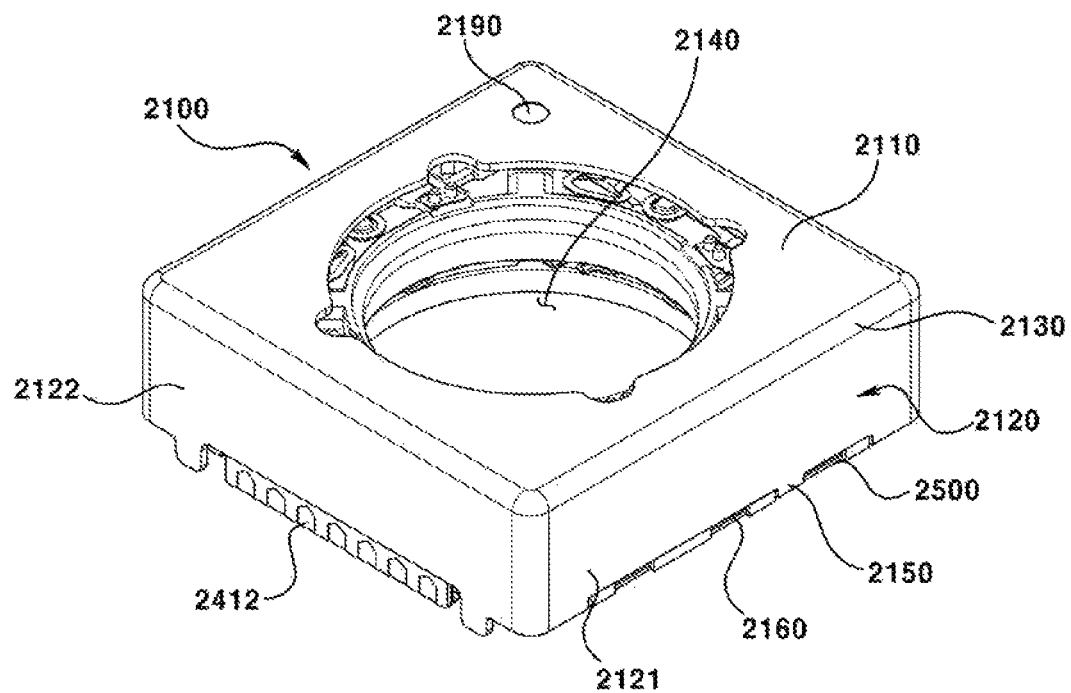
FIG. 24 is a perspective view illustrating a lens driving apparatus according to a third exemplary embodiment of the present invention.
Figure 25:
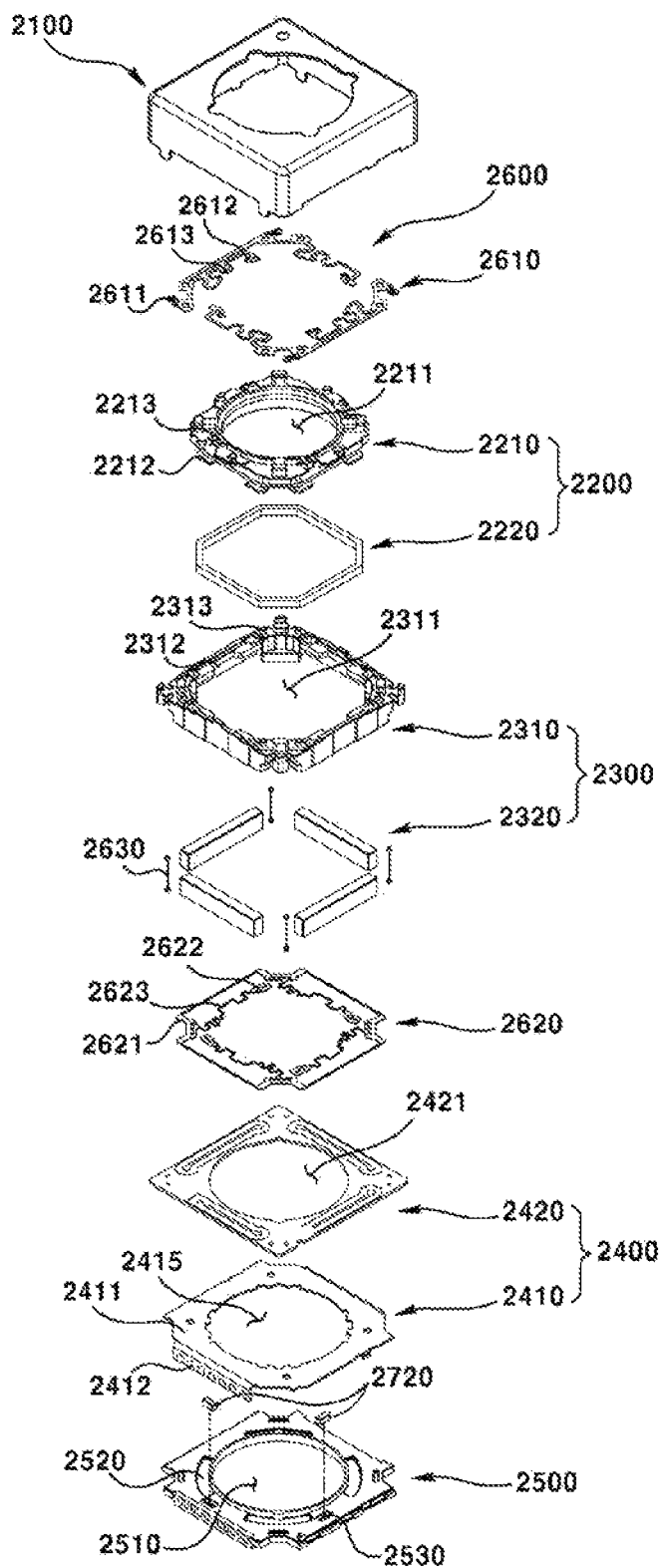
FIG. 25 is an exploded perspective view illustrating a lens driving apparatus according to a third exemplary embodiment of the present invention.
Figure 26:
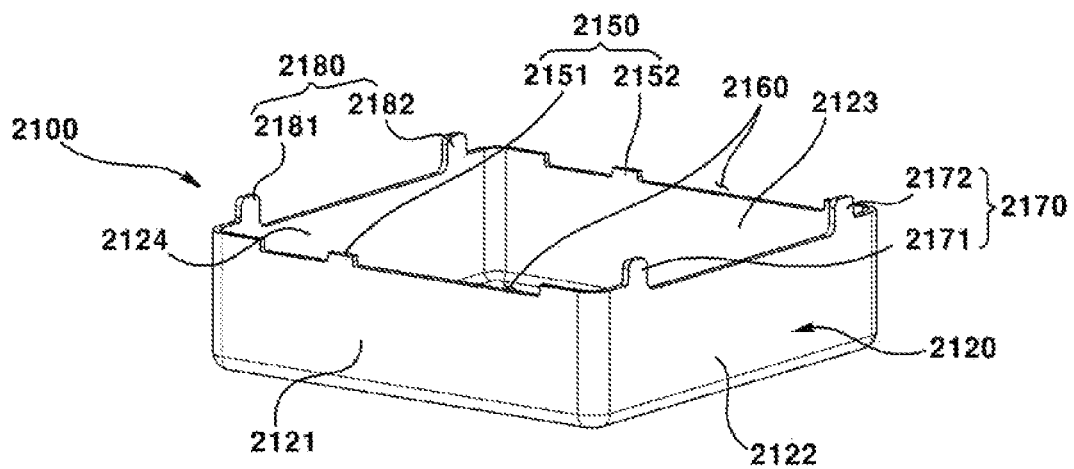
FIG. 26 is a perspective view illustrating a cover member of a lens driving apparatus according to a third exemplary embodiment of the present invention.
Figure 27:
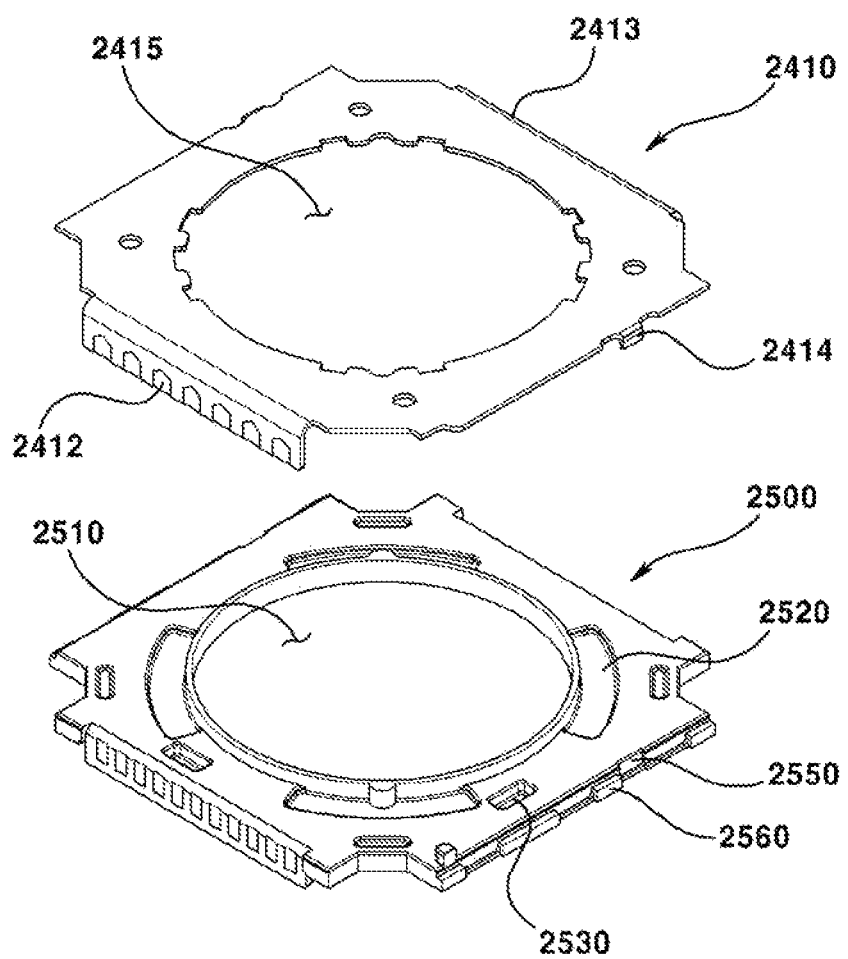
FIG. 27 is an exploded perspective view illustrating some elements of a lens driving apparatus according to a third exemplary embodiment of the present invention.
Figure 28:
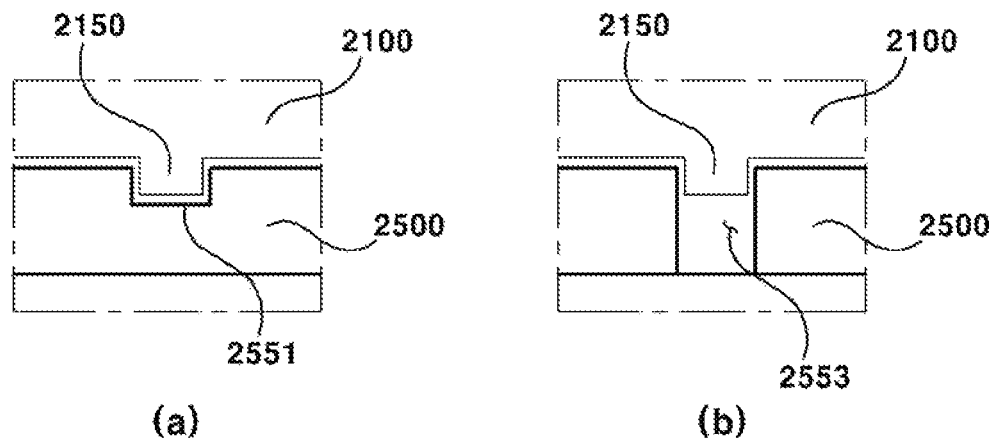
FIG. 28 is a conceptual view illustrating some elements (a) of a lens driving apparatus according to a third exemplary embodiment of the present invention and some elements (b) of a lens driving apparatus according to a modification of the present invention.
Figure 29:
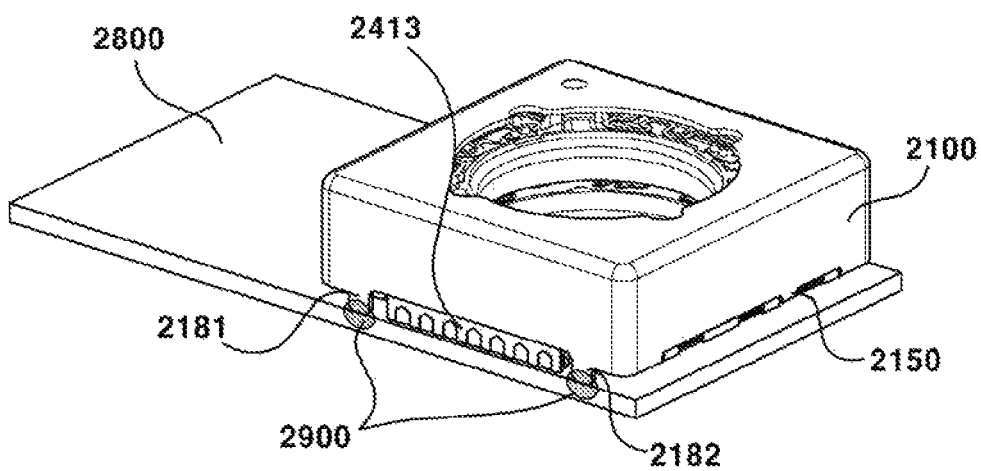
FIG. 29 is a perspective view illustrating a state where a lens driving apparatus according to a third exemplary embodiment of the present invention is coupled to a PCB of camera module.

FIG. 24 is a perspective view illustrating a lens driving apparatus according to a third exemplary embodiment of the present invention, FIG. 25 is an exploded perspective view illustrating a lens driving apparatus according to a third exemplary embodiment of the present invention, FIG. 26 is a perspective view illustrating a cover member of a lens driving apparatus according to a third exemplary embodiment of the present invention, FIG. 27 is an exploded perspective view illustrating some elements of a lens driving apparatus according to a third exemplary embodiment of the present invention, FIG. 28 is a conceptual view illustrating some elements (a) of a lens driving apparatus according to a third exemplary embodiment of the present invention and some elements (b) of a lens driving apparatus according to a modification of the present invention and FIG. 29 is a perspective view illustrating a state where a lens driving apparatus according to a third exemplary embodiment of the present invention is coupled to a PCB of camera module.

The lens driving device may include a cover member (2100), a first mover (2200), a second mover (2300), a stator (2400), a base (2500), a support member (2600) and a sensor part. However, the lens driving device according to the exemplary embodiment of the present invention may omit any one of the cover member (2100), the first mover (2200), the second mover (2300), the stator (2400), the base (2500), the support member (2600) and the sensor part.

The cover member (2100) may accommodate at an inner space a housing (2310) and a bobbin (2210). The cover member (2100) may be coupled to the base (2500). The cover member (2100) may form an exterior look of lens driving device. The cover member (2100) may take a bottom-opened cubic shape. However, the present invention is not limited thereto.

The cover member (2100) may be formed with a metal material, for example. To be more specific, the cover member (2100) may be formed with a metal plate.

In this case, the cover member (2100) may shield an EMI (Electromagnetic Interference). Because of this characteristic in the cover member (2100), the cover member (2100) may be called an "EMI shield can". The cover member (2100) may prevent electric waves generated from outside of the lens driving device from entering an inside of the cover member (2100). Furthermore, the cover member (2100) may prevent the electric waves generated from inside of the cover member (2100) from being emitted to outside of the cover member (2100). However, the material of cover member (2100) is not limited thereto.

The cover member (2100) may include an upper plate (2110), a lateral plate (2120) and a round part (2130). The cover member (2100) may include a lateral plate (2102) coupled to the base (2500) at a lower end. The cover member (2100) may include an upper plate (2110) disposed on an upper side of housing (2310). The cover member (2100) may include a round part (2130) roundly connecting the lateral plate (2120) and the upper plate (2110). A lower end of the lateral plate (2120) at the cover member (2100) may be mounted on the base (2500). An inner lateral surface of the cover member (2100) may be tightly adhered to a partial or all of a lateral surface at the base (2500) to be mounted on the base (2500). An inner space formed between the cover member (2100) and the base (2500) may be disposed with the first mover (2200), the second mover (2300), the stator (2400) and the support member (2600). Through this structure, the cover member (2100) can protect inner elements from external shocks and simultaneously prevent introduction of external foreign objects. However, the present invention is not limited thereto, and a lower end of the lateral plate (2120) at the cover member (2100) may be directly coupled to the PCB (2800) disposed on a lower side of base (2500).

The cover member (2100) may include an opening (2140) exposing the lens module by being formed on the upper plate (2110). The opening (2140) may be formed in a shape corresponding to that of the lens module. The size of opening (2140) may be formed greater than that of a diameter of the lens module in order to allow the lens module to be assembled through the opening (2140). Meantime, a light introduced through the opening (2140) may pass through the lens module. At this time, the light having passed the lens module may be obtained by the image sensor as an image.

The cover member (2100) may be coupled to a base (2500). The cover member (2100) may form an inner space with the base (2500). The cover member (2100) may include a metal material. The cover member (2100) including the metal material may perform an EMI shield function.

The lateral plate (2120) of cover member (2100) may include continuously adjacent first to fourth lateral plates (2121, 2122, 2123, 2124). The first lateral plate (2121) may be interposed between the fourth lateral plate (2124) and the second lateral plate (2122). The second lateral plate (2122) may be interposed between the first lateral plate (2121) and the third lateral plate (2123). The third lateral plate (2123) may be interposed between the second lateral plate (2122) and the fourth lateral plate (2124). The fourth lateral plate (2124) may be interposed between the third lateral plate (2123) and the first lateral plate (2121).

The cover member (2100) may be formed with a first erroneous insertion prevention part (not shown). The first erroneous insertion prevention part may be formed at a lower end of cover member (2100). The first erroneous insertion prevention part may be coupled to a second erroneous insertion prevention part formed at the base (2500). The first erroneous insertion prevention part may be fitted to the second erroneous insertion prevention part formed at the base (2500). The first erroneous insertion prevention part may have a shape that is not corresponding based on a center of cover member (2100). Through this structural characteristic, the lens driving device according to the exemplary embodiment of the present invention may prevent an erroneous insertion of cover member (2100).

That is, in the lens driving device according to an exemplary embodiment of the present invention, and in case the cover member (2100) is inserted with an erroneous directivity of the cover member (2100), the insertion itself of cover member (2100) to the base (2500) cannot be realized because of the first erroneous insertion prevention part of cover member (2100) and the second erroneous insertion prevention part of base (2500). The first erroneous insertion prevention part may include a protrusion (2150) protruding downwardly from the lower end of the cover member (2100).

The protrusion (2150) may protrude downwardly from the lower end of the cover member (2100). The protrusion (2150) may include a first lug (2151) formed at a first lateral plate (2121) of cover member (2100). The protrusion (2150) may include a second lug (2152) formed on a third lateral plate (2123) of cover member (2100). At this time, the first lateral plate (2121) and the third lateral plate (2123) may be so disposed as to face each other. The first lateral plate (2121) and the third lateral plate (2123) may not be symmetrical about a center of cover member (2100). Through this structure, the first lateral plate (2121) and the third lateral plate (2123) can be inserted into a reception part (2550) only when the cover member (2100) is inserted into the base (2500) to a designated direction.

The first erroneous insertion prevention part may include a recess part (2160) recessed upwardly from a lower end of cover member (2100). The recess part (2160) may not be symmetrical about a center of cover member (2100). The recess part (2160) may be disposed with an insertion part (2560) of base (2500). That is, the recess part (2160) can accommodate the insertion part (2560) of base (2500). However, in a modification, the protrusion (2150) protruded downwardly from the lower side of recess part (2160) of cover member (2100) may be replaced with an additional recess part (not shown) recessed upwardly from the recess part (2160).

The cover member (2100) may include a support part (2170, 2180) adjacently disposed to a terminal part (2412, 2413) of substrate (2410). The support part (2170, 2180) may prevent the lens driving device according to an exemplary embodiment of the present invention from being damaged by a force pressing from an upper side when the optical instrument is assembled.

The cover member (2100) may include a first support part (2170) extended downwardly from one side of lateral plate (2120) of cover member (2100) corresponding to one side of substrate (2410). At this time, the lateral plate (2120) at one side of cover member (2100) corresponding to one side of substrate (2410) may be a second lateral plate (22122). The cover member (2100) may include a second support part (2180) extended downwardly from the other side of lateral plate (2120) of cover member (2100) corresponding to the other side of substrate (2410). At this time, the other side of lateral plate (2120) of cover member (2100) corresponding to the other side of substrate (2410) may be a fourth lateral plate (2124).

The lower end of first support part (2170) and second support part (2180) may correspond to a lower end of the first terminal part (2412) and the second terminal part (2413), or may be disposed lower than a lower end of the first terminal part (2412) and the second terminal part (2413). Through this structure, the terminal part (2412, 2413) of substrate (2410) may be prevented from being damaged when the cover member (2100) is pressed from an upper side to a lower side when the optical instrument is assembled.

The cover member (2100) may include a support part (2170, 2180) extended downwardly from a lower side of lateral plate (2120). The cover member (2100) may include a support part (2170, 2180) extended over a lower end of terminal part (2412, 2413) of substrate (2410) disposed on the base (2500) downwardly from a lateral plate of cover member (2100). At this time, the lower end of support part (2170, 2180) may correspond to, or may be disposed on a lower side than a lower surface of base (2500). Furthermore, the lower end of support part (2170, 2180) may correspond to, or may be disposed on a lower side than the lower end of the terminal part (2412, 2413).

The support part (2170, 2180) may be coupled with a PCB (2800) using a coupling member (2900). The support part (2170, 2180) may be coupled to the PCB (2800) by soldering. Furthermore, the support part (2170, 2180) may be fixed to the PCB (2800) by an active alignment bond. In this case, the active alignment bond is adhered to a lower surface of base (2500) and to the support part (2170, 2180) as well, such that the active alignment can be easily implemented. Here, the active alignment means an actual hardening (curing) work after temporary curing of lens driving device to the PCB (2800) using an adhesive agent in order to adjust an optical axis of lens module coupled to the image sensor mounted on the PCB (2800) and to the bobbin (2210).

The support part (2170, 2180) may include a first support part (2170) disposed on the second lateral plate (2122) of cover member (2100), and a second support part (2180) disposed on the fourth lateral plate (2124) of cover member (2100). The first support part (2170) may include a first support lug (2171) and a second support lug (2172) each spaced apart from the first terminal part (2412) to both sides of longer side of first terminal part (2412). The second support part (2180) may include a third support lug (2181) and a fourth support lug (2182) each spaced apart from the second terminal part (2413) to both sides of longer side of second terminal part (2413).

The first support lug (2171) and the third support lug (2181) may be symmetrically formed about a center of cover member (2100). The second support lug (2172) and the fourth support lug (2182) may be symmetrically formed about a center of cover member (2100).

The cover member (2100) may be formed with a direction indication marking (2190) exposed to outside. The direction indication marking (2190) may be exposed to outside by being formed on the cover member (2100). At this time, the direction indication marking (2190) may be lopsidedly disposed on the upper plate (2110) of cover member (2100) to one side. Through this structure, a worker can easily recognize the directivity of lens driving device coupled by the cover member (2100) by ascertaining and checking the direction indication marking (2190). The direction indication marking (2190) may be formed in the shape of a through hole passing through the cover member (2100).

The first mover (2200) may include a bobbin (2210) and an AF coil part (2220). The first mover (2200) may include a bobbin (2210) coupled with the lens module. The first mover (2200) may include an AF coil part (2220) disposed on the bobbin (2210) and moving by an electromagnetic interaction with the bobbin (2210).

The bobbin (2210) may be accommodated into an inner space of cover member (2100). The bobbin (2210) may be coupled with the lens module. To be more specific, an inner circumferential surface of bobbin (2210) may be coupled with an outer circumferential surface of lens module. The bobbin (2210) may be disposed with an AF coil part (2220). The bobbin (2210) may be coupled by an AF coil part (2220). An upper surface of bobbin (2210) may be coupled by an upper support member (2610). The bobbin (2210) may be disposed on an inside of housing (2310). The bobbin (2210) may relatively move to the housing (2310) to an optical axis direction.

The bobbin (2210) may include a lens reception part (2211), a first driving coupling part (2212), an upper coupling part (2213), a lower coupling part (not shown) and a lug (2215). The bobbin (2210) may be formed at an inside with an upper/lower opened lens reception part (2211). The bobbin (2210) may include a lens reception part (2211) formed there inside. The lens reception part (2211) may be coupled by the lens module. The lens reception part (2211) may be formed at an inner circumferential surface with a screw thread having a corresponding shape to a screw thread formed at an outer circumferential surface of the lens module. That is, the lens reception part (2211) may be screw-connected to the lens module. An adhesive agent may be interposed between the lens module and the bobbin (2210). At this time, the adhesive agent may be an epoxy that is cured by UV or heat. That is, the lens module and the bobbin (2210) may be adhered by an UV curing epoxy and/or heat curing epoxy.

The bobbin (2210) may include a first driving coupling part (2212) disposed by an AF coil part (2220). The first driving coupling part (2212) may be integrally formed with an outside of the bobbin (2210). Furthermore, the first driving coupling part (2212) may be continuously formed along the outside of the bobbin (2210) or spaced apart from the outside of bobbin (2210) at a predetermined distance. For example, the first driving coupling part (2212) may be formed by allowing a portion of the outside of bobbin (2210) to be recessed in a shape corresponding to that of the AF coil part (2220). At this time, the AF coil part (2220) may be directly wound on the first driving coupling part (2212). In a modification, the first driving coupling part (2212) may be formed in an upper/bottom opened shape. At this time, the AF coil part (2220) may be inserted into and coupled with the first driving coupling part (2212) through a portion opened in a pre-wound state.

The bobbin (2210) may include an upper coupling part (2213) coupled with the upper support member (2610). The upper coupling part (2213) may be coupled with an inside part (2612) of upper support member (2610). For example, a lug (not shown) of the upper coupling part (2213) may be coupled by being inserted into a groove or a hole (not shown) of the inside part (2612) of upper support member (2610). At this time, the lug of upper coupling part (2313) may fix the upper support member (2610) by being heat-fused in a state of being inserted into the hole of inside part (2612).

The bobbin may include a lower coupling part coupled with the lower support member (2620). The lower coupling part may be coupled with the inside part (2622) of lower support member (2620). For example, a lug (not shown) of the lower coupling part may be coupled by being inserted into a groove or a hole (not shown) of an inside part (2622) of lower support member (2620). At this time, the lug of lower coupling part may fix the lower support member (2620) by being heat-fused in a state of being inserted into the hole of inside part (2622).

The AF coil part (2220) may be wound on an outside of bobbin (2210) by being guided to the first driving coupling part (2212). Furthermore, in another exemplary embodiment, the AF coil part (2220) may be such that four coils are independently disposed on an outer peripheral surface of bobbin (210) to allow two adjacent coils to form a 90°. The AF coil part (2220) may face a driving magnet (2320). The AF coil part (2220) may be so disposed as to electromagnetically interact with the driving magnet (2320). The AF driving part (2220) may move the bobbin (2210) relative to the housing (2310) through the electromagnetic interaction with the driving magnet (2320).

The AF driving coil (2220) may include a pair of lead cables (not shown) in order to supply a power. At this time, the pair of lead cables on the AF driving coil (2220) may be electrically coupled to a pair of upper support members (2610). That is, the AF coil part (2220) may receive an electric power through the upper support member (2610). Through this structure, when an electric power is supplied to the AF coil part (2220), an electromagnetic field may be formed about the AF coil part (2220).

The second mover (2300) may move for OIS function. The second mover (2300) may be so formed at an outside of the first mover (2200) as to face the first mover (2200). The second mover (2300) may move the first mover (2200) or move along with the first mover (2200). The second mover (2300) may be movably supported by a stator (2400) disposed thereunder and/or base (2500). The second mover (2300) may be disposed on an inner space of the cover member (2100). The second mover (2300) may include a housing (2310) and a driving magnet (2320). The second mover (2300) may include a housing (2310) disposed on an outside of bobbin (2210). Furthermore, the second mover (2300) may include a driving magnet (2320) facing the AF coil part (2220) and fixed to the housing (2310). At least one portion of housing (2310) may take a shape corresponding to that of an inner surface of the cover member (2100). Particularly, an outside of housing (2310) may be formed in a shape corresponding to that of an inside of a lateral plate (22120) of cover member (2100). The housing (2310) may take a cubic shape including four lateral surfaces, for example. However, the housing (2310) may take any shape that can be disposed on an inside of the cover member (2100). The housing (2310) may be formed in an injection-molded article in consideration of productivity.

The housing (2310) may be disposed on an outside of bobbin (2210). The housing (2310) may be disposed on the bobbin (2210). The housing (2310) may be disposed on an upper side of base (2500). The housing (2310) is a portion moving for OIS driving and may be spaced apart from the cover member (2100) at a predetermined distance. However, in an AF model, the housing (2310) may be fixed onto the base (2500). Alternatively, in an AF model, an upper support member (2610) may be coupled to an upper surface of housing (2310). The housing (2310) may include an inner space (2311), a second driving coupling part (2312), an upper coupling part (2313) and a lower coupling part (not shown).

The housing (2310) may be upper/lower side-opened to movably and horizontally accommodate the first mover (2200). The housing (2310) may be formed at an inside with an upper/lower side-opened inner space (2311). The inner space (2311) may be movably disposed with the bobbin (2210). That is, the inner space (2311) may be formed in a shape corresponding to that of bobbin (2210). Furthermore, an inner surface of housing (2310) forming the inner space (2311) may be spaced apart from an outside of bobbin (2210).

The housing (2310) may include a second driving coupling part (2312) formed at a lateral surface in a shape corresponding to that of driving magnet (2320) to accommodate the driving magnet (2320). The second driving coupling part (2312) may fix the driving magnet (2320) by accommodating the driving magnet (2320). The driving magnet (2320) may be adhered to the second driving coupling part (2312) using an adhesive agent (not shown). Meantime, the second driving coupling part (2312) may be disposed on an inner circumferential surface of housing (2310). In this case, there is an advantage to an electromagnetic interaction with the AF coil part (2220) disposed on an inside of the driving magnet (2320). In this case, an electromagnetic interaction between an OIS coil part (2420) disposed on a lower side of driving magnet (2320) and a driving magnet (2320) may be advantageously conducted. The second driving coupling part (2312) may be formed in four (4) pieces, for example. Each of the four second driving coupling part (2312) may be coupled by a driving magnet (2320).

The housing (2310) may include an upper coupling part (2313) coupled with the upper support member (2610). The upper coupling part (2313) may be coupled with an outside (2611) of upper support member (2610). For example, a lug of the upper coupling part (2313) may be coupled by being inserted into a groove or a hole (not shown) of the outside (2611) of upper support member (2610). At this time, the lug of upper coupling part (2313) may fix the upper support member (2610) by being heat fused in a state of being inserted into the hole of the outside (2611).

The housing (2310) may include a lower coupling part coupled with the lower support member (2620). The lower coupling part may be coupled with the outside (2621) of lower support member (2620). For example, a lug of the lower coupling part may be coupled by being inserted into a groove or a hole (not shown) of an outside (2621) of lower support member (2620). At this time, the lug of lower coupling part may fix the lower support member (2620) by being heat fused in a state of being inserted into the hole of the outside (2621).

The driving magnet (2320) may be accommodated into an inner space of the cover member (2100). The driving magnet (2320) may face the AF coil part (2220). The driving magnet (2320) may move the AF coil part (2220) through an electromagnetic interaction with the AF coil part (2220). The driving magnet (2320) may be disposed on the housing (2310). The driving magnet (2320) may be fixed to the second driving coupling part (2312) of housing (2310). The driving magnet (2320) may be disposed on the housing (2310) so that four coils are independently disposed to allow two adjacent magnets to form a 90°. That is, the driving magnet (2320) may promote an efficient use of inner volume through the magnets mounted at an equidistance at four lateral surfaces of housing (2310). Furthermore, the driving magnet (2320) may be adhered to the housing (2310) using an adhesive agent.

The stator (2400) may include a substrate (2410) and an OIS coil part (2420), for example. The stator (2400) may include a substrate (2410) interposed between the OIS coil part (2420) and the base (2500). Furthermore, the stator (2400) may include an OIS coil part (2420) facing the driving magnet (2320).

The substrate (2410) may include a flexible PCB, which is an FPCB. The substrate (2410) may be interposed between the base (2500) and the housing (2310). The substrate (2410) may be interposed between the OIS coil part (2420) and the base (2500). The substrate (2410) may supply an electric power to the OIS coil part (2420). The substrate (2410) may supply an electric power to the AF coil part (2220). For example, the substrate (2410) may supply an electric power to the AF coil part (2220) through a lateral support member (2630) and the upper support member (2610). Furthermore, the substrate (2410) may supply an electric power to an AF sensor part through the lateral support member (2630) and the upper support member (2610).

The substrate (2410) may include a body part *2411), a first terminal part (2412), a second terminal part (2413), a ground pad part (2414) and a through hole (2415). The substrate (2410) may include a body part (2411). The substrate (2410) may include a first terminal part (2412) extended from one side of body part (2411) to be downwardly bent. The substrate (2410) may include a second terminal part (2413) extended from the other side of body part (2411) to be downwardly bent.

At this time, any one of the first and second terminal parts (2412, 2413) may be used for input of electric power to the lens driving device and the other one may be used for Hall input/output of sensor part. At this time, the first and second terminal parts (2412, 2413) may be disposed on a mutually opposite side. Through this structure, the lens driving device is not normally operated when the first and second terminal parts (2412, 2413) are adversely coupled. That is, the lens driving device according to an exemplary embodiment of the present invention can minimize a mistake where a worker adversely couple the first and second terminal parts (2412, 2413) to the PCB (2800) because there is a direction indication marking (2190) on the cover member (2100) that is exposed to an outside, so that the cover member (2100) can be coupled to the base (2500) only in a pre-set posture.

The substrate (2410) may be formed with a ground pad part (2414) contacting the protrusion (2150). The ground pad part (2414) may be formed on the substrate (2410). The ground pad part (2414) may be in contact with the protrusion (2150) of cover member (2100). Through this structure, the cover member (2100) may be grounded. The cover member (2100) can shield the EMI. The substrate (2410) may include a through hole (2411) passing a light having passed the lens module.

The OIS coil part (2420) may move the driving magnet (2320) through the electromagnetic interaction. The OIS coil part (2420) may be disposed on the substrate (2410). The OIS coil part (2420) may be interposed between the base (2500) and the housing (2310). The OIS coil part (2420) may face the driving magnet (2320). When an electric power is applied to the OIS coil part (2420), the driving magnet (2320) and the housing (2310) fixed with the driving magnet (2320) can integrally move through the interaction between the OIS coil part (2420) and the driving magnet (2320).

The OIS coil part (2420) may be formed with an FP (Fine Pattern) coil mounted on the substrate (2410). This case may be advantageous in the aspect of miniaturizing (decreasing the height to an optical axis direction, which is a z axis direction) the lens driving device. The OIS coil part (2420) may be formed to minimize the interference with an OIS sensor part (2720) disposed on a lower side, for example. The OIS coil part (2420) may be so disposed as not to overlap with the OIS sensor part (2720) to a vertical direction.

The OIS coil part (2420) may be formed with a through hole (2421) passing a light having passed the lens module. The through hole (2421) may have a diameter corresponding to that of the lens module. The through hole (2421) of OIS coil part (2420) may have a diameter corresponding to that of a through hole (2411) of the substrate (2410). The through hole (2421) of OIS coil part (2420) may have a diameter corresponding to that of a through hole (2510) of the base (2500). The through hole (2421) may be round, for example. However, the present invention is not limited thereto.

The base (2500) may be disposed on the PCB (2800). The base (2500) may be fixed to the PCB (2800) using an active alignment adhesive agent. The base (2500) may be disposed on a lower side of bobbin (2210). The base (2500) may be disposed on a lower side of housing (2310). The base (2500) may support the second mover (2300). The base (2500) may be formed at a lower side with a PCB. The base (2500) may function as a sensor holder protecting an image sensor mounted on the PCB.

The base (2500) may include a through hole (2510), a foreign object collection (capture) part (2520) and a sensor mounting part (2530). The base (2500) may include a second erroneous insertion prevention part (not shown). The base (2500) may include a reception part (2550) and an insertion part (2560).

The base (2500) may include a through hole (2510) formed at a position corresponding to that of the lens reception part (2211) of bobbin (2210). Meantime, the through hole (2510) of base (2500) may be coupled by an IR ray filter. However, the IF ray filter may be coupled to a separate sensor holder disposed on a lower surface of base (2500).

The base (2500) may include a foreign object collection part (2520) collecting a foreign object introduced into the cover member (2100). The foreign object collection part (2520) may be disposed on an upper surface of base (2500) to capture an adhesive material and a foreign object in an inner space formed by the cover member (2100) and the base (2500).

The base (2500) may include a sensor mounting part (2530) coupled by the OIS sensor part (2720). That is, the OIS sensor part (2720) may be mounted on the sensor mounting part (2530). At this time, the OIS sensor part (2720) may detect the horizontal movement or a tilt of the housing (2310) by detecting the driving magnet (2320) coupled to the housing (2310). The sensor mounting part (2530) may be formed in two (2) pieces, for example. Each of the two sensor mounting parts (2530) may be disposed with an OIS sensor part (2720). In this case, the OIS sensor part (2720) may include a first axis sensor and a second axis sensor so formed as to detect all the x axis and y axis direction movement of housing (2310).

The second erroneous insertion prevention part may be formed on the base (2500). The second erroneous insertion prevention part may be coupled with the first erroneous insertion prevention part. The second erroneous insertion prevention part may include a reception part (2550) accommodating a protrusion (22150) by being inwardly recessed from a side surface of base (2500).

The reception part (2550) may be inwardly recessed from a side surface of base (2500). The reception part (2550) may accommodate the protrusion (22150). The reception part (2550) may at least partially take a shape corresponding to that of protrusion (22150). The reception part (2550) may include a first groove (2551) having a shape corresponding to a lug (2151, 2152) of cover member (2100) as shown in FIG. 28(a). The reception part (2550) may include a first groove (2551) having a shape corresponding to that of a first lug (2151) and accommodating the first lug (2151). The reception part (2550) may a second groove (not shown) having a shape corresponding to that of a second lug (2152) and accommodating the second lug (2152). The first groove (2551) may have a shape corresponding to that of first lug (2151). The first groove (2551) may accommodate the first lug (2151). The second groove may have a shape corresponding to that of the second lug (2152). The second groove may accommodate the second lug (2152).

The reception part (2550), as a modification, may include a third groove (2553) partially having a shape corresponding to that of lug (2151, 2152) of cover member (2100) as illustrated in FIG. 28(b) and having an opened shape at a lower side. The reception part (2550) may partially have a lower side-opened third groove (2553) having a shape corresponding to that of the first lug (2151). The reception part (2550) may include a lower side-opened fourth groove (not shown) partially having a shape corresponding to that of the second lug (22152). The third groove (2553) may partially have a shape corresponding to that of first lug (2151). The fourth groove may partially have a shape corresponding to that of the second lug (2152). The fourth groove may be opened at a lower side.

The second erroneous insertion prevention part may include an insertion part (2560) protruded from the base (2500) and accommodated into the recess part (2160). The insertion part (2560) may be protruded from a side surface of base (2500) to a side direction to be accommodated into the recess part (2160) of cover member (2100). The insertion part (2560) may be discontinuously formed as shown in FIG. 24.

The support member (2600) may connect more than at least two of the first mover (2200), the second mover (2300), the stator (2400) and the base (2500). The support member (2600) may elastically connect more than at least two of the first mover (2200), the second mover (2300), the stator (2400) and the base (2500) to support a relative movement of each element. At least a portion of the support member (2600) may be so formed as to have elasticity. In this case, the support member (2600) may be called an elastic member or a spring.

The support member (2600) may include an upper support member (2610), a lower support member (2620) and a side support member (2630), for example. At this time, the upper support member (2610) and the lower support member (2620) may be called an "auto focusing spring", an "AF elastic member" and the like. Furthermore, the side support member (2630) may be called an "OIS spring", an "OIS elastic member" and the like.

The upper support member (2610) may be coupled to an upper surface of housing (2310) and to an upper surface of bobbin (2210). An inner part (2612) of upper support member (2610) may be coupled to an upper coupling part (2213) of bobbin (2210) and an outside part (2611) of upper support member (2610) may be coupled to an upper coupling part (2313) of housing (2310).

The support member (2610) may include an outside part (2611), an inner part (2612) and a connection part (2613). The upper support member (2610) may include an inner part (2612) coupled to the bobbin (2210). The upper support member (2610) may include an outside part (2611) coupled to the housing (2310). The upper support member (2610) may include a connection part (2613) connecting the inner part (2612) and the outside part (2611).

The lower support member (2620) may be coupled to a lower surface of housing (2310) and to a lower surface of bobbin (2210). The lower support member (2620) may include an outside part (2621), an inner part (2622) and a connection part (2623). The lower support member (2620) may include an outside part (2621) coupled to the housing (2310), an inner part (2622) connected to the bobbin (2210) and a connection part (2623) elastically connecting the inner part (2622) and the outside part (2621). The lower support member (2620) may be integrally formed, for example. However, the present invention is not limited thereto. As a modification, the lower support member (2620) may be divisibly formed in a pair to be used for supplying an electric power to the AF coil part (2220).

The side support member (2630) may elastically support the housing (2310) relative to the base (2500). The side support member (2630) may be coupled at one side to the stator and/or the base (2500), and may be coupled at the other side to the upper support member (2610) and/or housing (2310). The side support member (2630) may be coupled to the stator and the upper support member (2610). The side support member (2630) may be coupled at one side to the stator (2400), and may be coupled at the other side to the upper support member (2610). Through this structure, the side support member (2630) may elastically support the second mover (2300) relative to the stator (2400) to allow the second mover (2300) to horizontally mover or tilt. The side support member (2630) may include a plurality of wires, for example. Alternatively, the side support member (2630), as a modification, may include a plurality of leaf springs, for example. Meantime, the side support member (2630) may be integrally formed with the upper support member (2610).

The side support member (2630) or the upper support member (2610) may include a shock absorber (not shown) in order to absorb shocks. The shock absorber may be formed at any one or more of the side support member (2630) and the upper support member (2610). The shock absorber may be a separate member such as a damper. Alternatively, the shock absorber may be realized through a partial shape change of any one or more of the side support member (2630) and the upper support member (2610).

The sensor part may be formed for any one or more of the AF feedback and OIS feedback. The sensor part may detect the position or movement of any one or more of the first mover (2200) and the second mover (2300). The sensor part may include an AF sensor part and an OIS sensor part, for example. The AF sensor part may provide information for AF feedback by sensing a relative vertical movement of bobbin (2210) relative to the housing (2310). The OIS sensor part (2720) may provide information for OIS feedback by detecting a horizontal movement or tilt of second mover (2300).

The AF sensor part may include an AF sensor (not shown), a sensor substrate (not shown) and a sensing magnet (not shown). The AF sensor may be disposed on an upper surface of housing (2310). At this time, the sensing magnet may be disposed on an upper surface of bobbin (2210). The AF sensor may be disposed on the housing (2310) while being mounted on a sensor substrate. The AF sensor may detect the position or movement of bobbin (2210) by detecting the sensing magnet disposed on the bobbin (2210). The AF sensor may be a Hall sensor detecting magnetism (magnetic power) of sensing magnet. However, the present invention is not limited thereto.

The OIS sensor part (2720) may be disposed on the stator (2400). The OIS sensor part (2720) may be disposed on an upper surface or a lower surface of substrate (2410). The OIS sensor part (2720) may be disposed on the sensor mounting part (2530) formed at the base (2500) by being disposed on a lower side of the substrate (2410), for example. The OIS sensor part (2720) may be a Hall sensor, for example. In this case, the OIS sensor part (2720) may sense the relative movement of second mover (2300) relative to the stator (2400) by sensing the magnetic field of the driving magnet (2320). The OIS sensor part (2720) may detect all the x axis and y axis movement by including a first axis sensor and a y axis sensor, for example. Meantime, the OIS sensor part (2720) may be so disposed as not to vertically overlap with an FP coil of the OIS coil part (2420).

Hereinafter, the operation of camera module according to the third exemplary embodiment of the present invention.

First, the auto focus function of camera module according to a third exemplary embodiment will be explained.

When an electric power is supplied to the AF coil part (2220), the AF coil part (2220) may move relative to the driving magnet (2320) through the electromagnetic interaction between the AF coil part (2220) and the driving magnet (2320). At this time, the bobbin (2210) coupled by the AF coil part (2220) may integrally move with the AF coil part (2220). That is, the lens module and the bobbin (2210) coupled there inside may move to an optical axis direction (vertical and horizontal directions) relative to the housing (2310). This movement of bobbin (2210) may result in the lens module moving closely to or distantly from the image sensor, whereby the focus adjustment on a subject can be implemented by supplying an electric power to the AF coil part (2220) according to the third exemplary embodiment of the present invention.

Meanwhile, the camera module according to a third exemplary embodiment of the present invention may be applied with an auto focus feedback in order to implement a more accurate auto focus function. The AF sensor disposed on the housing (2310) and formed in a Hall sensor may detect a magnetic field of sensing magnet fixed to the bobbin (2210). Thus, when the bobbin (2210) implements a relative movement to the housing (2310), the amount of magnetic field detected by the AF sensor may be changed. The AF sensor may transmit a detection value to the controller by detecting a movement of z axis direction of bobbin (2210) or a position of bobbin (2210) using the abovementioned method. The controller may determine whether to implement an additional movement relative to the bobbin (2210) through the received detected value.

These series of processes are generated in real time, whereby the auto focus function according to the present exemplary embodiment can be more accurately performed through the auto focus feedback.

Now, the OIS function of camera module according to the third exemplary embodiment will be described. When a power is supplied to the OIS coil part (2420), the driving magnet (2320) may perform a movement relative to the OIS coil part (2420) through the electromagnetic interaction between the OIS coil part (2420) and the driving magnet (2320). At this time, the housing (2310) coupled by the driving magnet (2320) may integrally move with the driving magnet (2320). That is, the housing (2310) may horizontally move relative to the base (2500). However, the housing (2310) may be induced of tilt relative to the base (2500). Meantime, the bobbin (2210) may move integrally with the housing (2310). Hence, the aforementioned movement of the housing (2310) may result in the lens module moving to a direction relative to the image sensor parallel to a direction (direction perpendicular to the optical axis, horizontal direction) where the image sensor is placed, such that the OIS function can be implemented by supplying a power to the OIS coil part (2420) in the present exemplary embodiment.

Meantime, in order to perform a more accurate realization of OIS function on the camera module according to the present exemplary embodiment, an OIS feedback may be applied. The one pair of OIS sensor parts (2720) mounted on the base (2500) and provided in the form of Hall sensor may detect a magnetic field of the driving magnet (2320) fixed to the housing (2310). Thus, when the housing (2310) performs a relative movement to the base (2500), the amount of magnetic field detected by the OIS sensor part (2720) can be changed. The pair of OIS sensor parts (2720) may detect the horizontal movement (x axis and y axis directions) or the position of the housing (2310) using the thus-mentioned method and may transmit a received detection value to the controller. The controller may determine whether to perform an additional movement to the housing (2310) through the received detection value. These series of processes are generated in real time, whereby the OIS function of the camera module according to the present exemplary embodiment can be more accurately performed through the OIS feedback.

Although the present disclosure has been explained with all constituent elements forming the exemplary embodiments of the present disclosure being combined in one embodiment, or being operated in one embodiment, the present disclosure is not always limited thereto. That is, one or more of all the elements may be selectively coupled and operated within an object scope of the present invention.

Terms "includes", "comprises" or "have" as used herein mean the presence of relevant elements unless particularly otherwise defined, such that it should be appreciated that other elements may not be excluded but may be further included.

Unless otherwise defined, all terms including technical and scientific terms used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and the present invention, and will not be interpreted in an idealized or overly formal sense unless expressly so defined herein.

The foregoing explanation is intended to merely exemplify the technical ideas of the present invention, and therefore, it should be understood that numerous other modifications and amendments can be devised by those skilled in the art unless deviated from the intrinsic characteristics of the present invention. Thus, the exemplary embodiments disclosed in the present invention do not limit but explain the technical ideas of the present invention, and the scope of technical ideas of the present invention is not limited by the given exemplary embodiments. The scope of present invention may be interpreted by the following claims and all the technical ideas within the equivalent scope may be interpreted as including the right scope of the present invention.

The invention claimed is:

1. A lens driving device, comprising:
a cover member;
a housing disposed in the cover member;
a bobbin disposed in the housing so as to move in an optical axis direction;
a first coil disposed on the bobbin;
a first magnet disposed on the housing;
an upper elastic member disposed on an upper portion of the bobbin and connecting the bobbin and the housing;
a base disposed below the housing and coupled to the cover member;
a substrate disposed between the housing and the base and comprising a circuit member comprising a second coil facing the first magnet; and
a plurality of support members connecting the upper elastic member and the substrate,
wherein each of the plurality of support members is disposed on a position adjacent to an edge of the upper elastic member,
wherein the support member is connected to the upper elastic member at the position where a distance in an x-axis direction perpendicular to the optical axis direction and a distance in a y-axis direction perpendicular to the optical axis direction and the x-axis direction are different based on the edge of the upper elastic member,
wherein the substrate comprises a printed circuit board (PCB) disposed below the circuit member and electrically connected to the circuit member,
wherein the PCB comprises a plurality of first terminals connected to the first coil, and a plurality of second terminals connected to the second coil,
wherein the plurality of first terminals are symmetrically formed based on a center of the PCB, and
wherein the plurality of second terminals are symmetrically formed based on the center of the PCB.

2. The lens driving device of claim 1, wherein the PCB comprises a terminal surface disposed on a lateral surface of the base, and
wherein a first discrete distance between the plurality of support members perpendicular to a lengthwise direction of the terminal surface is shorter than a second discrete distance between the plurality of support members parallel with the lengthwise direction of the terminal surface.

3. The lens driving device of claim 2, wherein the terminal surface is formed with two pieces, each piece disposed on a mutually opposite side on a lateral surface of base, and
wherein a third discrete distance from a lateral surface of the circuit member of a side disposed with the terminal surface to the support member is greater than a fourth discrete distance from a lateral surface of circuit member at a side disposed with no terminal surface to the support member, when viewed from an upper side.

4. The lens driving device of claim 2, wherein the circuit member takes a square shape, and
wherein the support member is disposed on an area where the terminal surface is not belonged to in four areas of the circuit member divided by drawing two diagonal lines comprising an optical axis from four corners of the circuit member.

5. The lens driving device of claim 2, wherein the cover member accommodates the housing and is coupled to the base,
wherein the cover member comprises a first protrusion disposed on both sides of the terminal surface and protruding from the cover member to a lower side, and
wherein the first protrusion is coupled to a holder member disposed below the base.

6. The lens driving device of claim 5, wherein the cover member comprises a second protrusion protruding from the cover member to a lower side on a side where the terminal surface is not formed in the PCB.

7. The lens driving device of claim 1, wherein a lower portion of the support member is inserted into a through hole disposed on the substrate, and coupled with the substrate using a solder.

8. The lens driving device of claim 1, wherein the circuit member is formed with a through hole inserted by the support member, and
wherein the through hole is formed in the same number as that of the support member.

9. The lens driving device of claim 1, wherein the plurality of first terminals and the plurality of second terminals are formed with the same number of (+) terminals and the same number of (−) terminals, and
wherein the first terminal comprises a total six pieces, and the second terminal comprises a total of four pieces.

10. The lens driving device of claim 1, wherein the PCB comprises a conductive pattern connecting the first terminal or the second terminal to a terminal formed on the terminal surface,
wherein the conductive pattern comprises a first conductive pattern formed on an upper surface of the PCB, and a second conductive pattern formed on a lower surface of the PCB,
wherein the second conductive pattern is connected to the terminal formed on the terminal surface through a via hole.

11. The lens driving device of claim 1, comprising a bottom elastic member disposed on a lower portion of the bobbin and coupled to the bobbin and the housing.

12. The lens driving device of claim 1, wherein the support member is formed in four pieces, and formed with an elastic material.

13. The lens driving device of claim 1, wherein a connection part between the support member and the upper elastic member is disposed on an edge of the housing.

14. The lens driving device of claim 1, wherein a connection part between the support member and the upper elastic member is disposed on a vicinity of an edge of the cover member.

15. The lens driving device of claim 1, wherein the support member is disposed on an edge part of housing to elastically support the housing.

16. The lens driving device of claim 1, wherein the PCB comprises a flexible printed circuit board (FPCB).

17. The lens driving device of claim 16, wherein the first and second terminals are disposed on an inner edge of the PCB.

18. The lens driving device of claim 17, wherein the PCB comprises first and second corners opposite to each other, and wherein the plurality of second terminals comprises two terminals adjacent to the first corner of the PCB and other two terminals adjacent to the second corner of the PCB.

19. A lens driving device, comprising:
a cover member;
a housing disposed in the cover member;
a bobbin disposed in the housing so as to move in an optical axis direction;
a first coil disposed on the bobbin;
a first magnet disposed on the housing;
an upper elastic member disposed on an upper portion of the bobbin and connecting the bobbin and the housing;
a base disposed below the housing and coupled to the cover member;
a substrate disposed between the housing and the base and comprising a circuit member comprising a second coil facing the first magnet; and
a plurality of support members connecting the upper elastic member and the substrate,
wherein each of the plurality of support members is disposed on a position adjacent to an edge of the upper elastic member,
wherein the support member is connected to the upper elastic member at the position where a distance in an x-axis direction perpendicular to the optical axis direction and a distance in a y-axis direction perpendicular to the optical axis direction and the x-axis direction are different based on the edge of the upper elastic member,
wherein the substrate comprises a printed circuit board (PCB) disposed below the circuit member and electrically connected to the circuit member,
wherein the PCB comprises a terminal surface disposed on a lateral surface of the base,
wherein a first discrete distance between the plurality of support members perpendicular to a lengthwise direction of the terminal surface is shorter than a second discrete distance between the plurality of support members parallel with the lengthwise direction of the terminal surface,
wherein the terminal surface is formed with two pieces, each piece disposed on a mutually opposite side on the lateral surface of base, and
wherein a third discrete distance from a lateral surface of the circuit member of a side disposed with the terminal surface to the support member is greater than a fourth discrete distance from a lateral surface of circuit member at a side disposed with no terminal surface to the support member, when viewed from an upper side.

20. A lens driving device, comprising:
a cover member;
a housing disposed in the cover member;
a bobbin disposed in the housing so as to move in an optical axis direction;
a first coil disposed on the bobbin;
a first magnet disposed on the housing;
an upper elastic member disposed on an upper portion of the bobbin and connecting the bobbin and the housing;
a base disposed below the housing and coupled to the cover member;
a substrate disposed between the housing and the base and comprising a circuit member comprising a second coil facing the first magnet; and
a plurality of support members connecting the upper elastic member and the substrate,
wherein each of the plurality of support members is disposed on a position adjacent to an edge of the upper elastic member,
wherein the support member is connected to the upper elastic member at the position where a distance in an x-axis direction perpendicular to the optical axis direction and a distance in a y-axis direction perpendicular to the optical axis direction and the x-axis direction are different based on the edge of the upper elastic member,
wherein the substrate comprises a printed circuit board (PCB) disposed below the circuit member and electrically connected to the circuit member,
wherein the PCB comprises a terminal surface disposed on a lateral surface of the base,
wherein a first discrete distance between the plurality of support members perpendicular to a lengthwise direction of the terminal surface is shorter than a second discrete distance between the plurality of support members parallel with the lengthwise direction of the terminal surface,
wherein the cover member accommodates the housing and is coupled to the base,
wherein the cover member comprises a first protrusion disposed on both sides of the terminal surface and protruding from the cover member to a lower side, and
wherein the first protrusion is coupled to a holder member disposed below the base.

* * * * *